United States Patent
Fukagawa et al.

(10) Patent No.: US 8,733,919 B2
(45) Date of Patent: May 27, 2014

(54) ACTIVE ENERGY RAY-CURABLE INK COMPOSITION, INKJET RECORDING METHOD, AND INKJET PRINTED ARTICLE

(75) Inventors: Reiko Fukagawa, Kanagawa (JP); Misato Sasada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 299 days.

(21) Appl. No.: 13/215,259

(22) Filed: Aug. 23, 2011

(65) Prior Publication Data

US 2012/0056930 A1  Mar. 8, 2012

(30) Foreign Application Priority Data

Sep. 3, 2010  (JP) ................................. 2010-197740

(51) Int. Cl.
- *B41J 2/01* (2006.01)
- *B41J 2/21* (2006.01)
- *B41J 11/00* (2006.01)

(52) U.S. Cl.
CPC ...... *B41J 2/01* (2013.01); *B41J 2/2107* (2013.01); *B41J 11/002* (2013.01)
USPC .............................. 347/100; 347/95; 347/102

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ........... 347/100, 102, 101, 96, 95, 88, 99, 21, 347/20, 9; 106/31.6, 31.27, 31.13; 523/160, 523/161
See application file for complete search history.

(56) References Cited

U.S. PATENT DOCUMENTS

| | | | |
|---|---|---|---|
| 2008/0180503 A1* | 7/2008 | Umebayashi | 347/100 |
| 2009/0081420 A1* | 3/2009 | Tojo et al. | 428/195.1 |
| 2009/0131577 A1 | 5/2009 | Kato et al. | |
| 2009/0202724 A1* | 8/2009 | Arai et al. | 106/31.86 |
| 2010/0075052 A1 | 3/2010 | Irita | |
| 2010/0080913 A1 | 4/2010 | Irita | |
| 2010/0261103 A1 | 10/2010 | Sasaki et al. | |

FOREIGN PATENT DOCUMENTS

| | | |
|---|---|---|
| EP | 2058375 A | 5/2009 |
| EP | 2075293 A | 7/2009 |
| EP | 2166046 A | 3/2010 |
| EP | 2218757 A | 8/2010 |
| EP | 2295505 A | 3/2011 |
| EP | 2325268 A | 5/2011 |
| JP | 2007-70604 A | 3/2007 |
| JP | 2008-280427 | 11/2008 |
| JP | 2009-84494 A | 4/2009 |
| JP | 2009-149806 | 7/2009 |
| JP | 2009-256398 | 11/2009 |
| JP | 2009-263411 | 11/2009 |
| JP | 2010-069805 | 4/2010 |
| JP | 2010-070693 | 4/2010 |
| JP | 2010-095693 | 4/2010 |

OTHER PUBLICATIONS

English language translationof the following: Office action dated Mar. 4, 2014 from the JPO in a Japanese patent application corresponding to the instant patent application. This office action translation is submitted now in order to supplement the understanding of patent document JP2005-280427, JP2010-070693, JP2010-069805, JP2010-095693, JP2009-263411, JP2009-256398 and JP2009-149806 which are cited in the office action and are being disclosed in the instant information Disclosure Statement.

English language translation of the following: Office action dated Jan. 6, 2013 from the SIPO in a Chinese patent application corresponding to the instant patent application.

* cited by examiner

*Primary Examiner* — Manish S Shah
(74) *Attorney, Agent, or Firm* — SOLARIS Intellectual Property Group, PLLC

(57) ABSTRACT

An active energy ray-curable ink composition is disclosed which includes a colorant, a dispersant, a polymerizable compound and water. The dispersant includes a hydrophobic repeating unit including a residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound; a hydrophilic repeating unit including an ionic group; and a hydrophilic repeating unit including a nonionic group.

20 Claims, No Drawings

ACTIVE ENERGY RAY-CURABLE INK COMPOSITION, INKJET RECORDING METHOD, AND INKJET PRINTED ARTICLE

CROSS-REFERENCE TO RELATED APPLICATION

This application is based on and claims priority under 35 USC 119 from Japanese Patent Application No. 2010-197740 filed on Sep. 3, 2010, the disclosure of which is incorporated herein by reference.

BACKGROUND OF THE INVENTION

1. Technical Field

The present invention relates to an active energy ray-curable ink composition, an inkjet recording method, and an inkjet printed article.

2. Description of Related Art

In recent years, aqueous paints and inks have been studied due to the increase in needs for resource protection, environmental preservation, improvement in stability of work, and the like. However, most pigments are significantly inferior in applicability, such as pigment dispersibility, to an aqueous composition when compared with a case in which the pigments are used in oil paints or inks. Therefore, satisfactory quality is not achieved by a general dispersion method.

Japanese Patent Application Laid-Open (JP-A) No. 2009-84494 discloses an aqueous ink for inkjet recording containing a copolymer that contains a hydrophilic repeating unit and 80% by mass or more and less than 100% by mass of a hydrophobic repeating unit, a colorant, and an aqueous medium, for the purpose of improving dispersibility and long-term stability of a pigment.

As a measure for increasing the strength of a printed image obtained using an aqueous ink, there is known an ultraviolet-curable aqueous ink, for example.

For example, JP-A No. 2007-70604 discloses an aqueous ink containing a high-molecular-weight compound having a cross-linkable group at a side chain thereof, in order to improve the film strength or the like.

SUMMARY OF THE INVENTION

However, JP-A No. 2009-84494 is silent about substrate adhesiveness, which means an adhesiveness of an ink to a recording medium, and film strength, which means the strength of a formed film (i.e., formed image) when a pressure is applied thereto.

Furthermore, the method disclosed in JP-A No. 2007-70604 allows for improvement in simultaneous achievement of film strength and substrate adhesiveness.

In view of the above circumstances, the present invention provides an active energy ray-curable ink composition, an inkjet recording method, and an inkjet printed article.

According to a first aspect of the present invention, an active energy ray-curable ink composition is provided which includes a colorant, a dispersant, a polymerizable compound and water, wherein the dispersant includes a hydrophobic repeating unit including a residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound; a hydrophilic repeating unit including an ionic group; and a hydrophilic repeating unit including a nonionic group.

According to a second aspect of the present invention, an inkjet recording method is provided which includes ejecting the active energy ray-curable ink composition according to the first aspect of the invention onto a recording medium using an inkjet recording apparatus; and irradiating the ejected ink composition with an active energy ray to cure the ink composition.

According to a third aspect of the present invention, an inkjet printed article obtained by recording by the inkjet recording method according to the second aspect of the present invention is provided.

DETAILED DESCRIPTION OF THE INVENTION

Active Energy Ray-Curable Ink Composition

An active energy ray-curable ink composition of the invention includes (A) a colorant, (B) a dispersant, (C) a polymerizable compound and water, in which the dispersant (B) includes a hydrophobic repeating unit (a) including a residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound, a hydrophilic repeating unit (b) including an ionic group, and a hydrophilic repeating unit (c) including a nonionic group.

As used herein, the "active energy ray" is not particularly limited as long as it is an energy ray capable of applying energy to a composition so as to generate an initiation species when irradiated with the energy ray. Examples of the active energy ray include various energy rays such as α ray, γ ray, x ray, ultraviolet ray, visible light ray, or electron ray. In particular, from the viewpoints of curing sensitivity and availability of an apparatus, ultraviolet ray or electron ray is preferable, and ultraviolet ray is particularly preferable.

The active energy ray-curable ink composition of the invention can be used to form a cured ink image, by applying the ink composition to a recording medium, followed by irradiation with an active energy ray. In particular, the active energy ray-curable ink composition of the invention may be preferably used as an ink composition for inkjet recording.

<Dispersant (B)>

The dispersant (B) used in the invention is described in detail.

The dispersant (B) used in the invention is not particularly limited as long as it has a structure containing: a hydrophobic repeating unit (a) including a residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound; a hydrophilic repeating unit (b) including an ionic group; and a hydrophilic repeating unit (c) including a nonionic group. The dispersant (B) may further contain a repeating unit other than the hydrophobic repeating unit (a), a hydrophilic repeating unit (b), or a hydrophilic repeating unit (c). Hereinbelow, "hydrophobic repeating unit (a) including a residue obtained by removing one hydrogen atom from a compound selected from the group consisting of a benzene ring-containing compound, an aromatic hydrocarbon-condensed polycyclic compound, a heteromonocyclic compound and a hetero ring-condensed heteropolycyclic compound" may simply be referred to as "hydrophobic repeating unit (a)", "hydrophilic repeating unit (b) including an ionic group" may simply be referred to as "hydrophilic repeating unit (b)", and "hydrophilic repeating unit (c)

including a nonionic group" may simply be referred to as "hydrophilic repeating unit (c)".

The dispersant may be a random copolymer having the respective repeating units randomly introduced thereto, or a block copolymer having the respective repeating units regularly introduced thereto with no limitation to the introduction order of the respective repeating units. In particular, the dispersant is preferably a random copolymer.

Hereinbelow, description is in sequence to the hydrophobic repeating unit (a) including, as a hydrophobic repeating unit, a residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound, the hydrophilic repeating unit (b) including an ionic group as a hydrophilic repeating unit, and the hydrophilic repeating unit (c) including a nonionic group as a hydrophilic repeating unit.

—Hydrophobic Repeating Unit—

The hydrophobic repeating unit (a) that is a component of the dispersant (B) of the invention is described. The hydrophobic repeating unit used in the invention is not particularly limited as long as it has a hydrophobic repeating unit and is capable of increasing hydrophobicity of the dispersant to water.

<Hydrophobic Repeating Unit (a) Having Residue Obtained by Removing One Hydrogen Atom from Compound Selected from Group Consisting of Benzene Ring-containing Compound, Aromatic Hydrocarbon Ring-condensed Polycyclic Compound, Heteromonocyclic Compound and Hetero Ring-condensed Heteropolycyclic Compound>

The dispersant of the invention contains a hydrophobic repeating unit (a) including a residue obtained by removing one hydrogen atom from a compound selected from the group consisting of a benzene ring-containing compound, an aromatic hydrocarbon ring-condensed polycyclic compound, a heteromonocyclic compound and a hetero ring condensed heteropolycyclic compound. Single type of hydrophobic repeating unit (a) may be used alone, or a combination of two or more types thereof may be used.

As used in the context of the polycyclic compound or heteropolycyclic compound, the "polycyclic" refers to a compound formed by condensation of two or more rings, and the "heterocycle" refers to a ring containing at least one hetero atom such as a nitrogen atom, an oxygen atom, or a sulfur atom as a component of the ring skeleton. The term "hetero ring" also refers to a ring containing at least one hetero atom such as a nitrogen atom, an oxygen atom, or a sulfur atom as a component of the ring skeleton.

The benzene ring-containing compound is not particularly limited as long as it is a group including at least one benzene ring. Specifically, the benzene ring-containing compound is preferably a compound formed from 1 to 3 benzene rings bound to each other via a single bond, a divalent linking group, or a trivalent linking group, more preferably a group having 1 or 2 benzene rings, and most preferably a benzene ring. Specific examples include benzene, biphenyl, triphenylmethane, and diphenylmethane.

Examples of the divalent linking group in the benzene ring-containing compound include an alkenylene group (for example, an alkenylene group having from 2 to 6 carbon atoms, preferably an alkenylene group from 2 to 4 carbon atoms) and an alkylene group (for example, an alkylene group having from 1 to 3 Carbon atoms, preferably an alkylene group having 1 carbon atom). In particular, an alkylene group is preferable.

The trivalent linking group in the benzene ring-containing compound is preferably a residue obtained by removing 3 hydrogen atoms from an alkane (for example an alkane having from 1 to 3 carbon atoms, preferably an alkane having 1 carbon atom).

The benzene ring-containing compound in the repeating unit (a) may or may not have a substituent U, but it is preferable that the benzene ring-containing compound does not have a substituent. Examples of the substituent U which may be held by the benzene ring-containing compound include an alkyl group (for example, an alkyl group having from 1 to 6 carbon atoms, preferably from 1 to 3 carbon atoms), a halogen group (such as F, Cl, Br, or I); and a carbonyl group.

Examples of the aromatic hydrocarbon ring-condensed polycyclic compound in the repeating unit (a) include compounds in which two or more aromatic hydrocarbons are condensed. Preferable examples of the aromatic hydrocarbon ring-condensed polycyclic compound include a polycyclic compound in which at least one aromatic hydrocarbon and an alicyclic hydrocarbon are condensed. The number of carbon atoms of the compound represented by the aromatic hydrocarbon ring-condensed polycyclic compound is not particularly limited as long as it is 8 or more, but is preferably from 8 to 25, and more preferably from 9 to 18. Specific examples include a residue obtained by removing one hydrogen atom from a compound such as naphthalene, anthracene, fluorene, phenanthrene, or acenaphthene.

The compound formed from condensed aromatic hydrocarbon rings may have the substituent U, or may not have the substituent U.

The heteromonocyclic compound is preferably a 5-membered or 6-membered heteromonocyclic compound. The hetero atom included in the heteromonocyclic ring as a component of the ring skeleton is preferably a nitrogen atom, an oxygen atom, or a sulfur atom. The heteromonocyclic compound may have plural hetero atoms, which may be the same as or different from one another.

The heteromonocyclic compound may have or may not have the substituent U.

The hetero ring-condensed heteropolycyclic compound refers to a compound in which at least one heteromonocyclic compound and an aromatic hydrocarbon are condensed. Specific examples of the hetero ring-condensed heteropolycyclic compound include, but not limited to, phthalimide, naphthalimide, acridone, carbazole, benzoxazole, and benzothiazole.

The hetero ring-condensed heteropolycyclic compound may have or may not have the substituent U.

Among the residue obtained by removing one hydrogen atom from a compound selected from the group consisting of a benzene ring-containing compound, an aromatic hydro carbonring-condensed polycyclic compound, a heteromonocyclic compound and a hetero ring-condensed heteropolycyclic compound, in the hydrophobic repeating unit (a), a residue obtained by removing one hydrogen atom from a benzene ring-containing compound, an aromatic hydrocarbon ring-condensed polycyclic compound, or a hetero ring-condensed heteropolycyclic compound is preferable; and a residue obtained by removing one hydrogen atom from a benzene ring-containing compound or a hetero ring-condensed heteropolycyclic compound is more preferable.

Specific examples of the residue obtained by removing one hydrogen atom from a compound selected from the group consisting of a benzene ring-containing compound, an aromatic hydrocarbon-condensed polycyclic compound, a heteromonocyclic compound and a hetero ring-condensed heteropolycyclic compound in the hydrophobic repeating unit (a) are shown below, but the invention is not limited thereto. Herein, (W-1) to (W-4) are examples of a residue obtained by removing one hydrogen atom from a benzene ring-containing compound, (W-5) to (W-10) are examples of a residue obtained by removing one hydrogen atom from an aromatic hydrocarbon ring-condensed polycyclic compound, (W-11) is an example of a residue obtained by removing one hydrogen atom from a heteromonocyclic compound, and (W-12) to (W-15) are examples of a residue obtained by removing one hydrogen atom from a hetero ring-condensed heteropolycyclic compound. Of these, groups (W-1) to (W-4) and (W-12) to (W-15) are preferable. In the structures shown below, * indicates a binding position.

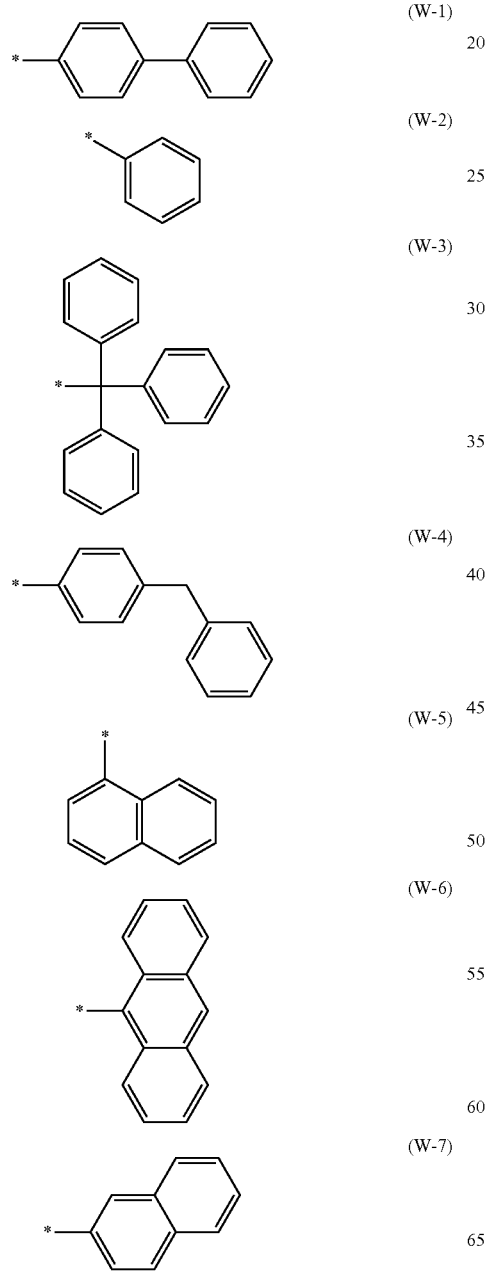

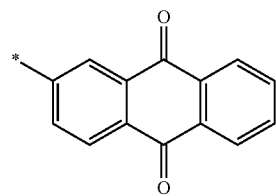

(W-8)

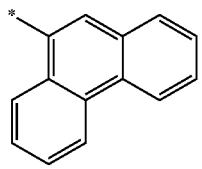

(W-9)

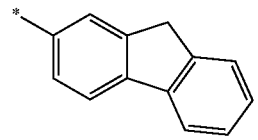

(W-10)

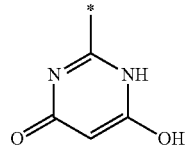

(W-11)

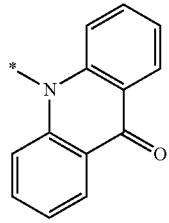

(W-12)

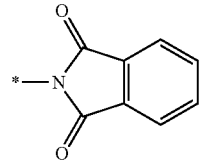

(W-13)

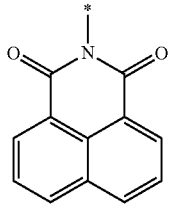

(W-14)

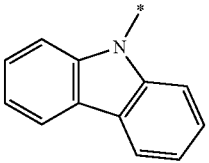

(W-15)

The hydrophobic repeating unit (a) used in the invention preferably has a structure represented by the following Formula (1).

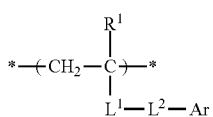

Formula (1)

In Formula (1), $R^1$ represents a hydrogen atom or a methyl group.

$L^1$ represents a single bond, —COO—, —OCO—, —CONR²—, or a phenylene group, and $R^2$ represents a hydrogen atom or an alkyl group.

$L^2$ represents a single bond, or at least one group selected from the group consisting of an alkylene group, an alkenylene group, —CO—, $NR^3$—, —O—, —S—, —SO— and —SO₂—, and $R^3$ represents a hydrogen atom or an alkyl group.

Ar represents a residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound, and * represents a binding position.

In Formula (1), the alkyl group represented by $R^2$ of —CONR²— in $L^1$ is not particularly limited, but may be an alkyl group having from 1 to 6 carbon atoms, preferably from 1 to 4 carbon atoms, and more preferably 1 or 2 carbon atoms. Specific examples thereof include a methyl group and an ethyl group.

The group represented by $L^1$ in Formula (1) may have or may not have a substituent, but is preferably unsubstituted.

Examples of the substituent which may be held by the group represented by $L^1$ in Formula (1) include, but not limited to, an alkyl group having from 1 to 6 carbon atoms, a halogen atom (such as F, Cl, Br, or I), a cyano group, and an alkoxy group having from 1 to 6 carbon atoms.

In Formula (1), $L^1$ is preferably a single bond, —COO—, —CONR²—, or a phenylene group, more preferably —COO—, —CONR²—, or a phenylene group, and most preferably —COO— or a phenylene group.

In Formula (1), $L^2$ represents a single bond or at least one group selected from the group consisting of an alkylene group, alkenylene group, —CO—, —$NR^3$—, —O—, —S—, —SO— and —SO₂—, which may have or may not have a substituent, and it is preferable that the group does not have a substituent. Examples of the substituent which may be held by $L^2$ in Formula (1) are the same as those of the substituent which may be held by $L^1$ in Formula (1).

The alkylene group in $L^2$ of Formula (1) may be, but not limited to, an alkylene group having from 1 to 6 carbon atoms, preferably from 1 to 4 carbon atoms, and more preferably 1 or 2 carbon atoms. Specific examples thereof include a methylene group and an ethylene group.

The alkenylene group in $L^2$ of Formula (1) may be, but not limited to, an alkenylene group having from 2 to 12 carbon atoms, preferably from 2 to 10 carbon atoms, more preferably from 2 to 6 carbon atoms, and most preferably from 2 to 4 carbon atoms.

$L^2$ in Formula (1) may be a combination of groups selected from a single bond, an alkylene group, alkenylene group, —CO—, —$NR^3$—, —O—, —S—, —SO— and —SO₂—, preferably a combination of —O— and an alkylene group or a combination of —CO— and —$NR^3$—, and most preferably a combination of —O— and an alkylene group (i.e., an oxyalkylene group).

$L^2$ in Formula (1) is preferably a single bond or at least one group selected from an alkylene group, —O—, —CO—, and —$NR^3$—, and more preferably a single bond or at least one group selected from an alkylene group and —O—.

Ar in Formula (1) represents a residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound, and has the same definition (including the preferred scope) as that of the a residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound in the repeating unit (a).

Ar in Formula (1) may have or may not have a substituent, but is preferably unsubstituted. Examples of the substituent which may be held by Ar are the same as those of the substituent U.

Hereinbelow, specific examples of monomers which may be used to form the hydrophobic repeating unit (a) that is a hydrophobic repeating unit. However, the invention is not limited thereto.

A-1

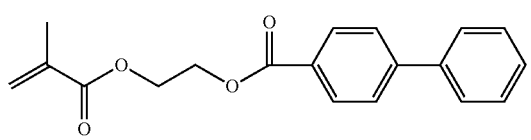

A-2

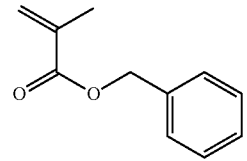

A-3

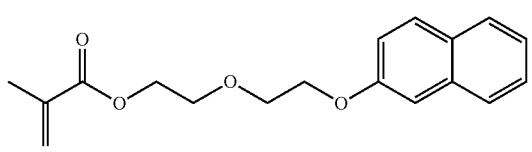

A-4

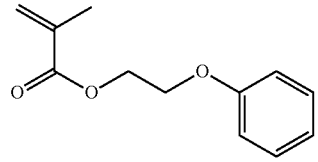

A-5

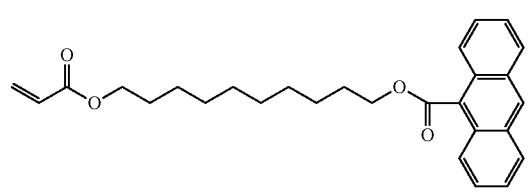

A-6
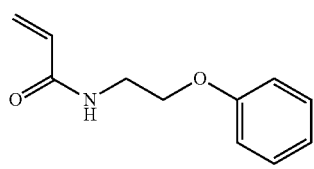
A-13
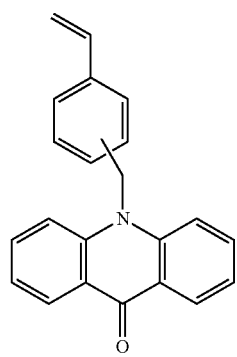
A-7
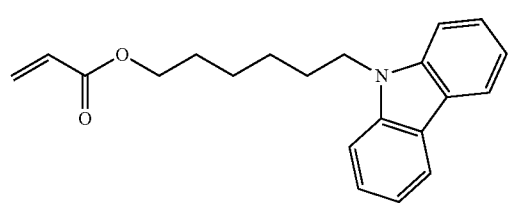
A-14
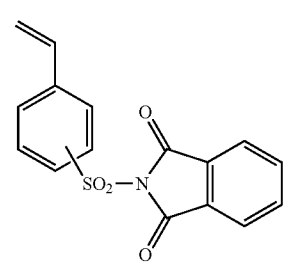
A-8
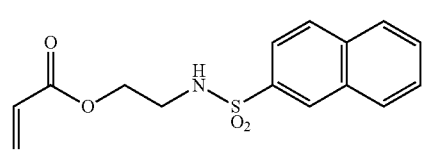
A-15
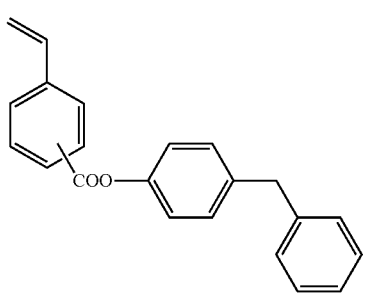
A-9
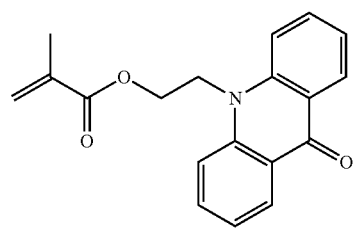
A-10
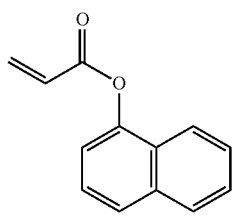
A-16
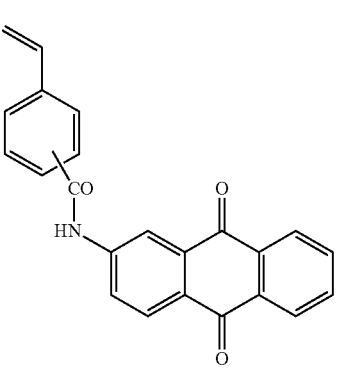
A-11
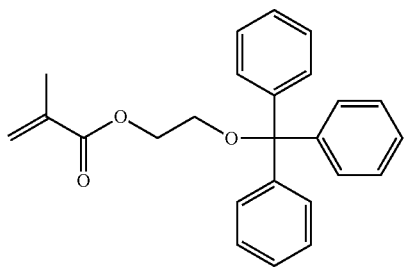
A-17
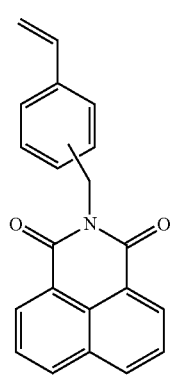
A-12
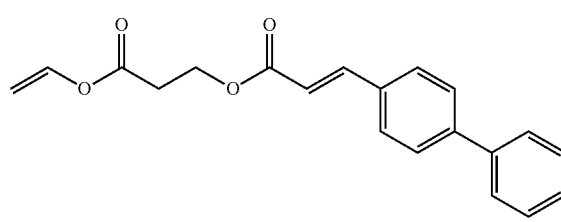

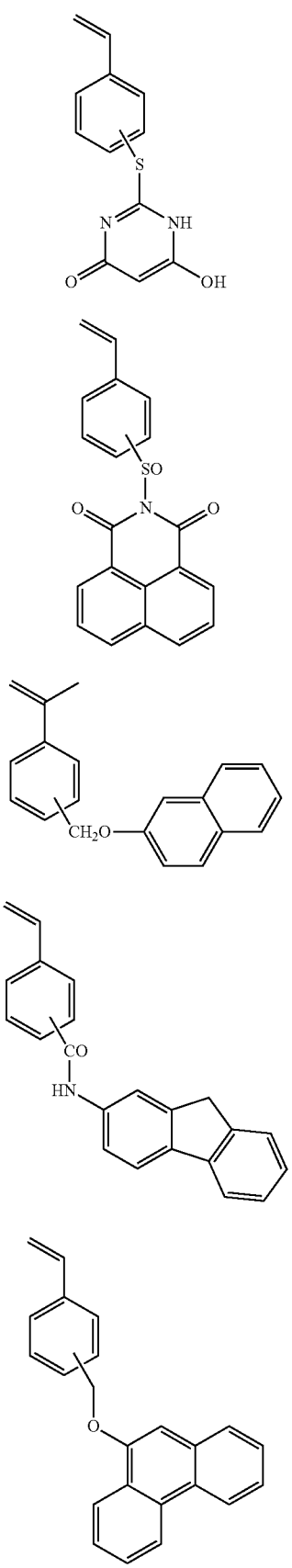

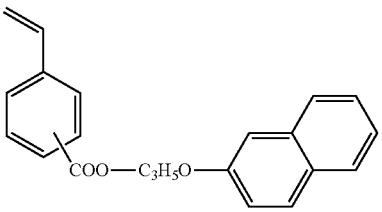

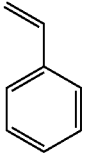

—Hydrophilic Repeating Unit—

The hydrophilic repeating unit that is a component of the dispersant (B) of the invention is described. The hydrophilic repeating unit used in the invention is not particularly limited as long as it has a hydrophilic repeating unit and is capable of increasing hydrophilicity of the dispersant to water.

The hydrophilic repeating unit used in the invention includes a hydrophilic repeating unit (b) including an ionic group and a nonionic hydrophilic repeating unit (c). Hereinbelow, respective hydrophilic repeating units are described.

<Hydrophilic Repeating Unit (b) Including an Ionic Group>

The hydrophilic repeating unit (b) including an ionic group used in the invention is not particularly limited as long as it is an anionic or cationic hydrophilic repeating unit, but preferably contains an anionic hydrophilic repeating unit. Single type of the hydrophilic repeating unit (b) including an ionic group may be used, or a combination of two or more thereof may be used.

The anionic group in the ionic group is not particularly limited as long as it is a group dissociable into an anion in an aqueous medium. For example, the anionic group is preferably at least one group selected from the group consisting of a carboxyl group, sulfonic acid group, and phosphoric acid group, and a carboxyl group is particularly preferable.

Examples of the monomer including an anionic group in the hydrophilic repeating unit (b) including an ionic group include, but not limited to, carboxyl group-containing monomers such as unsaturated carboxylic acid monomers, for example, (meth)acrylic acid, carboxyethyl (meth)acrylate, crotonic acid, itaconic acid, maleic acid, fumaric acid, citraconic acid, and 2-methacryloyloxymethyl succinate.

Examples of the monomer including a sulfonic acid group in the hydrophilic repeating unit (b) including an ionic group include p-styrene sulfonic acid, 2-acrylamide-2-methylpropane sulfonic acid, 3-sulfopropyl(meth)acrylate, and bis-(3-sulfopropyl) itaconate.

Examples of the monomer including a phosphoric acid in the hydrophilic repeating unit (b) including an ionic group include vinyl phosphonic acid, vinyl phosphate, bis(methacryloxyethy) phosphate, diphenyl-2-acryloyloxyethyl phosphate, diphenyl-2-methacryloyloxyethyl phosphate, and dibutyl-2-acryloyloxyethyl phosphate.

Of these specific examples of anionic group-containing monomers, carboxyl group-containing monomers are preferable, and acrylic acid and methacrylic acid are particularly preferable.

The cationic group is not particularly limited as long as it is a dissociable group into a cation in an aqueous medium, and is preferably at least one group selected from a tertiary amino group and an ammonium salt, for example.

Examples of the tertiary amino group in the cationic group is, but not limited to, a tertiary amino group represented by —$NR_2$ wherein $R_2$ represents a substituent. The substituents represented by $R_2$ of the tertiary amino group may be different from each other, and examples thereof include a straight-chained or branched alkyl group having from 1 to 8 carbon atoms (preferably from 1 to 4 carbon atoms), and an aryl group having from 6 to 20 carbon atoms (preferably a phenyl group).

Specific examples of the monomer which may be used to form the hydrophilic repeating unit (b) including a cationic group include, but not limited to:

tertiary amine-containing vinyl monomers such as N,N-dimethylaminoethyl (meth)acrylate, N,N-dimethylaminopropyl(meth)acrylate, N,N-diethylaminoethyl(meth)acrylate, N,N-diethylaminopropyl(meth)acrylate, N,N-dimethylaminoethyl(meth)acrylamide, N,N-dimethylaminopropyl (meth)acrylamide, N,N-diethylaminoethyl(meth)acrylamide, N,N-diethylaminopropyl (meth)acrylamide, vinyl pyrrolidone, 2-vinyl pyridine, 4-vinyl pyridine, 2-methyl-6-vinyl pyridine, or 5-ethyl-2-vinyl pyridine; and ammonium salt-containing monomers such as quaternarized N,N-dimethylaminoethyl (meth)acrylate, quaternarized N,N-diethylaminoethyl(meth)acrylate, or quaternarized N,N-dimethylaminopropyl (meth)acrylate.

When the dispersant (B) used in the invention contains an acidic group such as a carboxyl group, it is preferable that the dispersant (B) has an acid value of 5 mgKOH/g or more and less than 400 mgKOH/g, more preferably an acid value of 10 mgKOH/g or more and less than 350 mgKOH/g, and particularly preferably an acid value of 15 mgKOH/g or more and less than 300 mgKOH/g. As used herein, the acid value is defined by the mass (mg) of KOH required for completely neutralizing 1 g of the dispersant (B), and may be measured by a method according to JIS K0070 (1992), which is employed in the invention. The disclosure of JIS K0070 (1992) is incorporated by reference herein.

<Nonionic Hydrophilic Repeating Unit (c)>

The hydrophilic repeating unit (c) including a nonionic group is not particularly limited as long as it has a nonionic hydrophilic group, and any one of known monomers may be used. Single type of the hydrophilic repeating unit (c) including a nonionic group may be used, or a combination of two or more thereof may be used.

Examples of the nonionic group include, but not limited to, a hydroxyl group, an amide group (such as —$CONH_2$, —CONHR, or —$CONR_2$, wherein R represents a substituent), or a group represented by [—$(R^{11}—O)_n—R^{12}$], and a hydroxyl group or a group represented by [—$(R^{11}—O)_n—R^{12}$] is more preferable, and a group represented by [—$(R^{11}—O)_n—R^{12}$] is particularly preferable.

The substituent represented by R in the amide group is not particularly limited, but may be a chained or cyclic alkyl group having from 1 to 6 carbon atoms (preferably from 1 to 4 carbon atoms).

In the group represented by [—$(R^{11}—O)_n—R^{12}$], $R^{11}$ represents an alkylene group, and more specifically an alkylene group which may have a hydroxyl group and has from 1 to 6 carbon atoms (preferably from 1 to 4 carbon atoms); $R^{12}$ represents an alkyl group (preferably having from 1 to 6 carbon atoms) or a hydrogen atom; and n represents an integer of from 1 to 6, more preferably an integer of from 2 to 6, and particularly an integer of from 2 to 4.

The number of hydroxyl groups which may be placed on the group represented by [—$(R^{11}—O)_n—R^{12}$] is not particularly limited, but from the viewpoint of hydrophilicity of the dispersant (B), is preferably from 1 to 4, and more preferably from 1 to 3.

Specific examples of the monomer capable of serving as a component of the nonionic hydrophilic repeating unit (c) include:

amide-containing monomers such as acrylamide, methacrylamide, or n-isopropyl acrylamide;

hydroxyl group-containing monomers such as glycerin mono(meth)acrylate, 2-hydroxyethyl(meth)acrylate, or hydroxypropyl(meth)acrylate; and monomers including a group represented by [—$(R^{11}—O)_n—R^{12}$] such as polyethylene glycol (meth)acrylate, polypropylene glycol (meth)acrylate, polybutylene glycol (meth)acrylate, methoxypolyethylene glycol (meth)acrylate, ethoxypolyethylene glycol (meth)acrylate, or butoxypolyethylene glycol (meth)acrylate.

The content of the hydrophobic repeating unit (a) in the dispersant (B) is preferably from 10 to 90% by mass, more preferably from 20 to 80% by mass, and most preferably from 30 to 70% by mass, with respect to the total mass of the dispersant (B). A copolymerization ratio of 10% by mass or more is preferable from the viewpoint of fining of a pigment, and a copolymerization ratio of 90% by mass or less is preferable from the viewpoint of easiness in synthesis.

The terminal group of the main chain of the dispersant (B) is not particularly limited, but may be a terminal group derived from an initiator, for example.

The amount of the hydrophilic repeating unit (b) including an ionic group in the dispersant (B) is preferably from 1 to 60% by mass, more preferably from 2 to 50% by mass, and most preferably from 3 to 45% by mass, with respect to the total mass of the dispersant (B). A content of the hydrophilic repeating unit of 1% by mass or more is preferable from the viewpoint of dispersion stability, and a content thereof of 60% by mass or less is preferable from the viewpoint of interaction between the pigment and the dispersant.

The repeating unit (c) is contained in the dispersant (B) in an amount exceeding 0.1% by mass, more preferably more than 0.1% by mass and 40% by mass or less, further more preferably more than 0.1% by mass and 30% by mass or less, and particularly preferably from 0.1 to 25% by mass, with respect to the total mass of the dispersant (B).

The dispersant (B) may further contain a repeating unit other than the repeating units (a), (b), and (c). The repeating unit other than the repeating units (a), (b), and (c) may be, but not limited to, a hydrophobic structural unit or the like other than the residue obtained by removing one hydrogen atom from a benzene ring-containing compound, or from a aromatic hydrocarbon ring-condensed polycyclic compound, a heteromonocyclic compound, or a hetero ring-condensed heteropolycyclic compound. Specific examples include alkyl (meth)acrylates and alkyl (meth)acrylamides, and preferable examples include methyl(meth)acrylate, ethyl(meth)acrylate and butyl(meth)acrylate.

The content of the dispersant (B) used in the invention is preferably from 1 to 150% by mass, and more preferably from 5 to 100% by mass, with respect to the content of the colorant described below.

The weight average molecular weight (Mw) of the dispersant (B) is preferably from 1,000 to 1,000,000, more preferably from 1,500 to 500,000, and further more preferably from 1,500 to 250,000.

The molecular weight distribution (represented by value of weight average molecular weight/value of number average molecular weight) of the dispersant (B) is preferably from 1 to 6, and more preferably from 1 to 5. A molecular size distribution within the above ranges is preferable from the viewpoint of dispersion stability. Herein, the number average molecular weight and weight average molecular weight are values measured using a GPC analyzer equipped with TSK-gel GMHxL, TSK gel G4000HxL, and TSKgel G2000HxL columns (trade names, manufactured by Tosoh Corporation) using tetrahydrofuran (THF) as a solvent and a differential refractometer, and calculated in terms of polystyrene as a standard substance.

It was found that the film strength and adhesiveness of the film obtained by irradiation of an active energy ray are improved when the ink composition of the invention contains the dispersant (B) of the invention. The mechanism thereof is not clear, but assumed as described below. When the dispersant (B) contains the specific hydrophobic repeating unit (a), the colorant and the dispersant adhered to each other, and efficient dispersion of the colorant is allowed. The ink composition is cured in such a state in which the colorant is efficiently dispersed, and therefore a cured film obtained by irradiation with an active energy ray becomes strong, thereby improving the film strength. Furthermore, because the dispersant (B) in the ink composition has the hydrophilic repeating unit (c), the hydrophilic group in the dispersant penetrates into a recording medium (e.g., paper) together with water as the ink penetrates into the recording medium. Thus, the ink composition of the invention efficiently penetrates into a recording medium, and the ink composition is cured in a state in which the ink composition penetrates into the recording medium when the active energy ray is applied, thereby forming an image (film). Since the ink composition is cured in a state in which it penetrates into a recording medium, the adhesiveness between the image and the recording medium is increased, and the image tends not to be peeled from the recording medium. In this manner, the film strength and adhesiveness are assumed to be improved. However, the assumed mechanism is not intended to particularly limit the invention.

The dispersant used in the invention may be synthesized by various polymerization method such as solution polymerization, precipitation polymerization, suspension polymerization, bulk polymerization, or emulsification polymerization. The polymerization reaction may be carried out by a known operation such as a batch system, semi-continuous system, or continuous system.

As an initiation method of polymerization, there are a method using a radical initiator, a method using irradiation of an active energy ray or a radiation, and the like. The polymerization methods and initiation methods of polymerization are disclosed in, for example, Tsuruda Teiji, "Kobunshi Gosei Houhou", revised edition, (The Nikkan Kogyo Shinbun Ltd., 1971), and Otsu Takayuki, Kinosita Masanobu "Kobunsi Gosei no Jikkenhou", Kagaku-Dojin Publishing Company, Inc., 1972, pp. 124-154.

Among the polymerization method, a solution polymerization method using a radical initiator is particularly preferable. Examples of solvent used in a solution polymerization method include ethyl acetate, butyl acetate, acetone, methyl ethyl ketone, methyl isobutyl ketone, cyclohexanone, tetrahydrofuran, dioxane, N,N-dimethyl formamide, N,N-dimethylacetamide, benzene, toluene, acetonitrile, methylene chloride, chloroform, dichloroethane, methanol, ethanol, 1-propanol, 2-propanol, and 1-butanol. Any one of these solvents may be used singly, or a combination of two or more thereof may be used, or a mixed solvent with water may be used.

The polymerization temperature has to be set depending on the molecular weight of the dispersant to be produced, type of initiator, or the like, but is generally from about 0 to 100° C. It is preferable to carry out polymerization at a temperature of from 50 to 100° C.

The reaction pressure may be appropriately selected, but is generally from 1 to 100 kg/cm$^2$, and particularly preferably from 1 to 30 kg/cm$^2$. The reaction time is generally from about 5 hours to 30 hours. The obtained polymer may be subjected to purification such as re-precipitation.

Specific examples of the dispersant (B) preferably used in the invention are shown below, but the invention is not limited thereto.

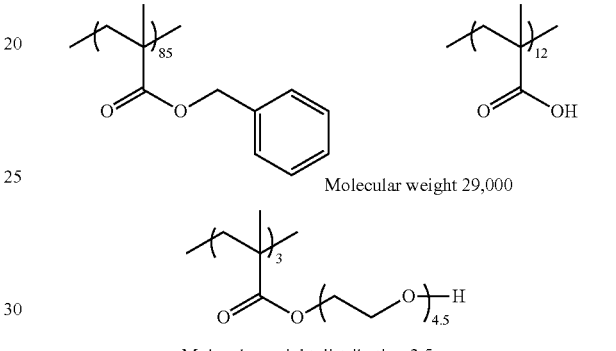

Molecular weight 29,000

Molecular weight distribution 2.5

(P-1)

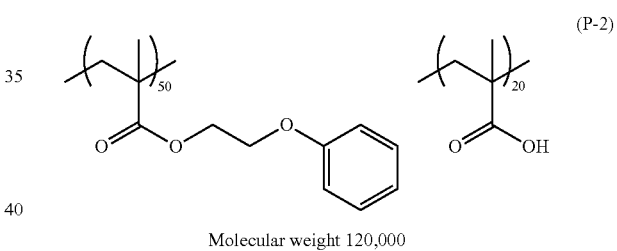

Molecular weight 120,000

(P-2)

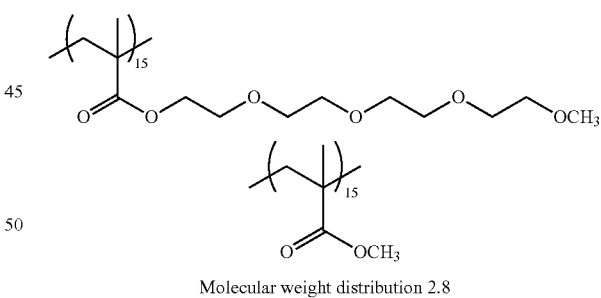

Molecular weight distribution 2.8

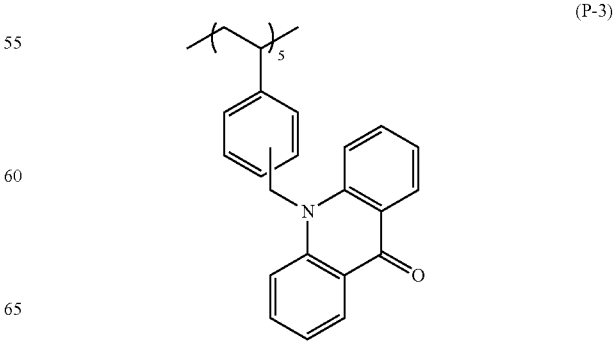

(P-3)

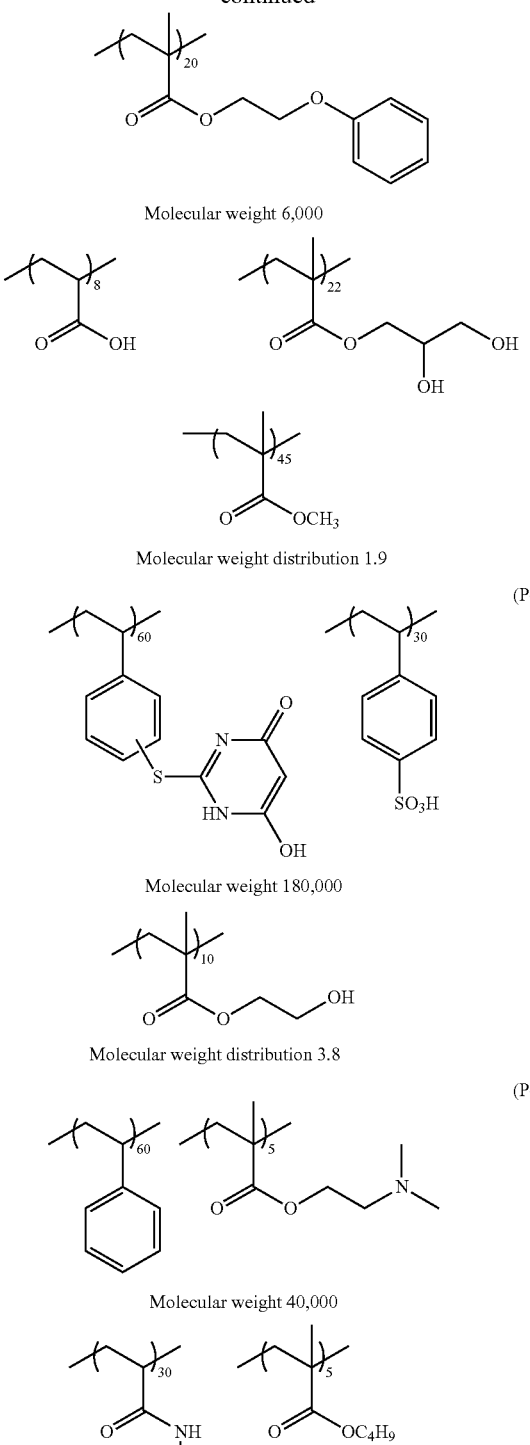
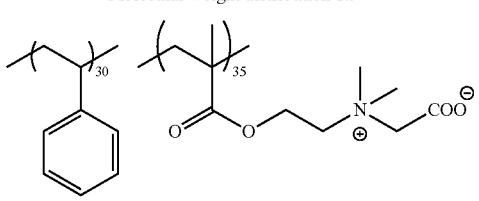
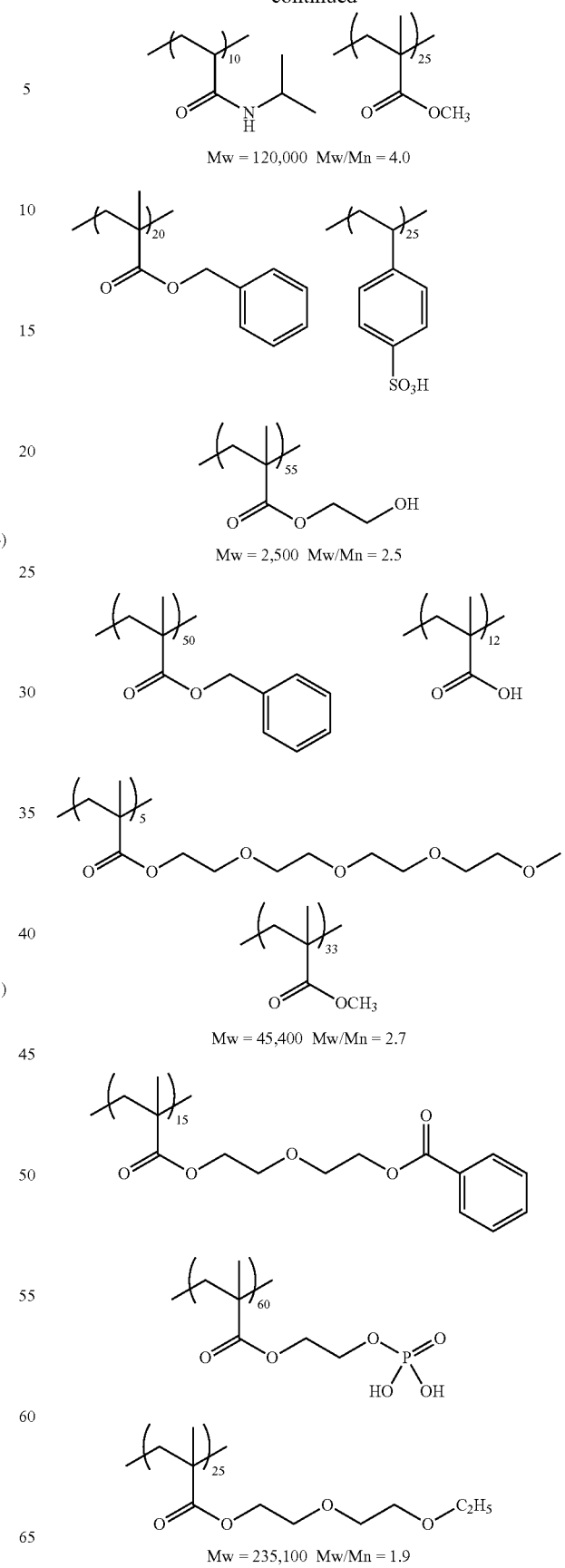

-continued
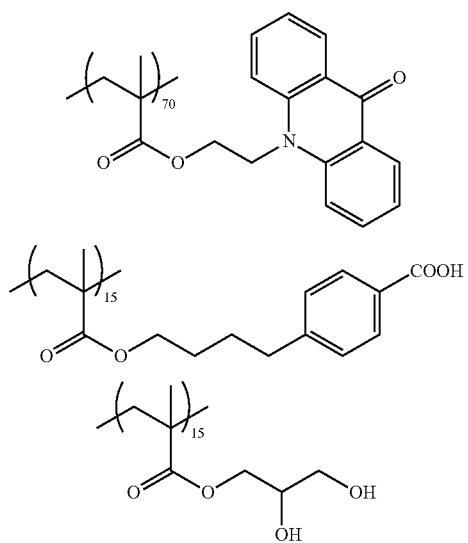
Mw = 1,200 Mw/Mn = 3.6
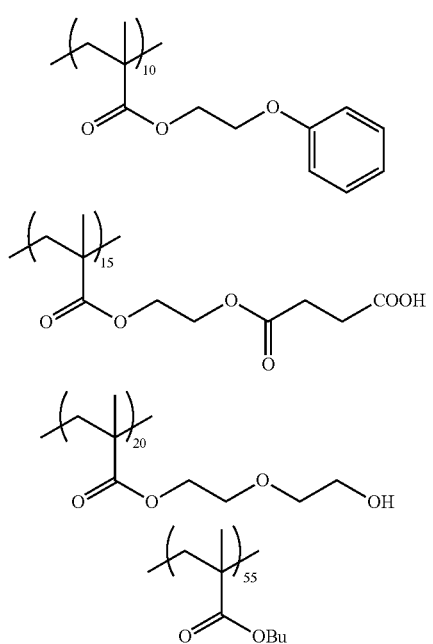
Mw = 460,000 Mw/Mn = 4.9
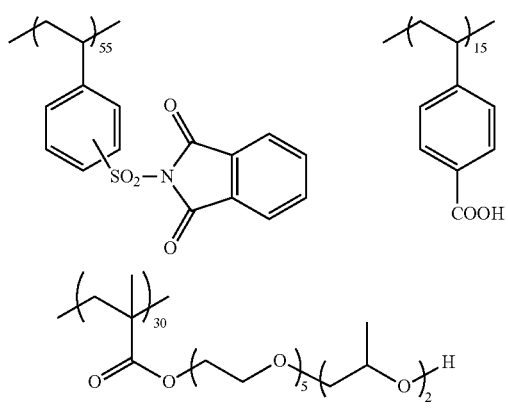
Mw = 150,700 Mw/Mn = 5.8
-continued
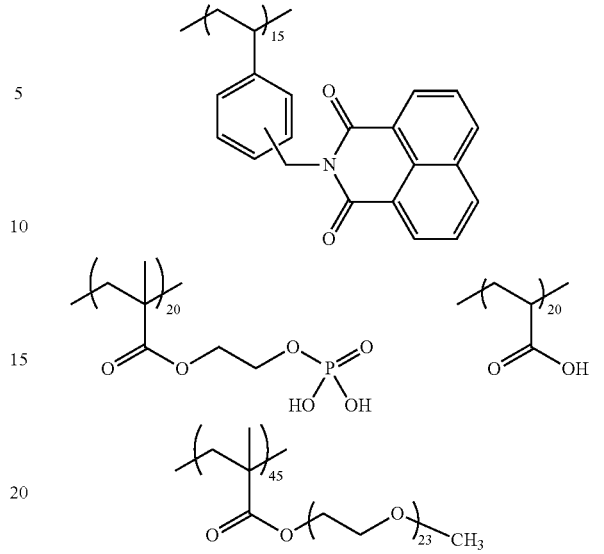
Mw = 44,000 Mw/Mn = 2.7
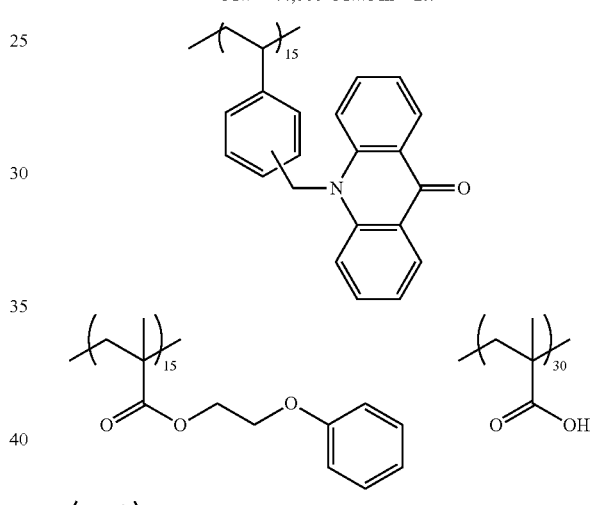
Mw = 330,000 Mw/Mn = 2.2
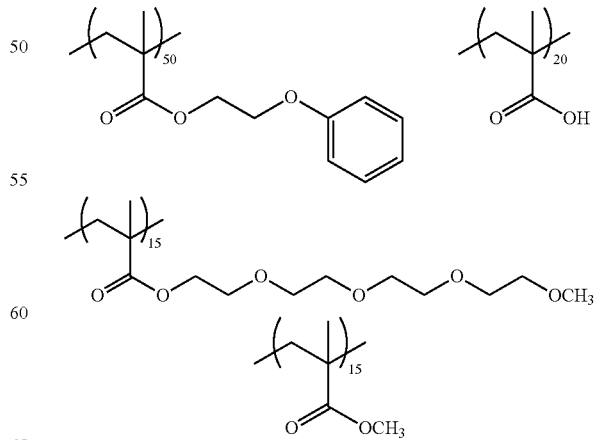
Mw = 450,300 Mw/Mn = 3.0

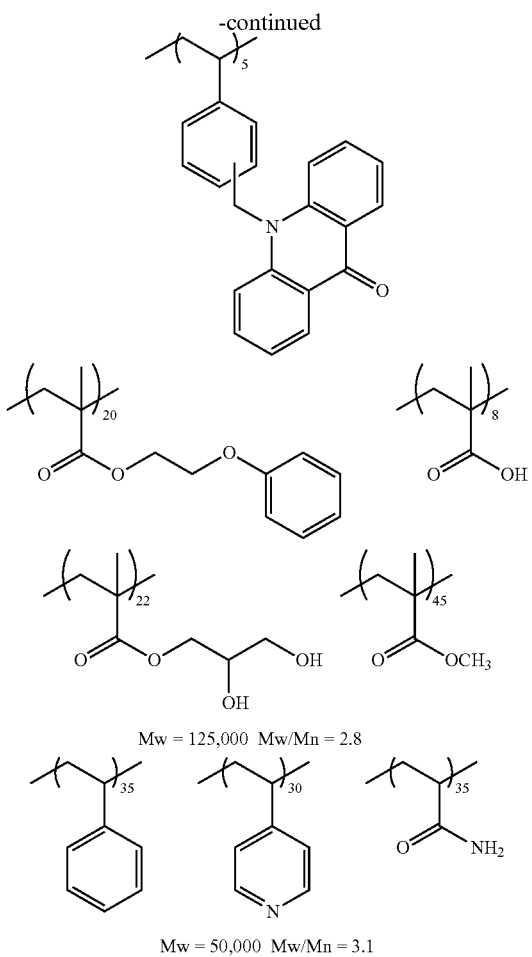

<Colorant (A)>

The ink composition of the invention contains a colorant (A).

The colorant which may be used in the invention is not particularly limited, and may be selected from any known colorants such as pigments, oil-soluble dyes, aqueous dyes, or dispersive dyes. In particular, the colorant is preferably a pigment or oil-soluble dye which has an excellent weather resistance and an excellent color reproducibility, and more preferably a pigment.

—Pigment—

The pigment used in the invention is not particularly limited and appropriately selected in accordance with purpose. For example, any of an organic pigment and an inorganic pigment may be used.

Examples of organic pigment include an azo pigment, a polycyclic pigment, a dye chelate, a nitro pigment, a nitroso pigment, and aniline black. Among these, an azo pigment and a polycyclic pigment are more preferable. Examples of the azo pigment include azo lake, an insoluble azo pigment, a condensed azo pigment, and a chelate azo pigment. Examples of the polycyclic pigment include a phthalocyanine pigment, a perylene pigment, a perinone pigment, an anthraquinone pigment, a quinacridon pigment, a dioxazine pigment, an indigo pigment, a thioindigo pigment, an isoindolinone pigment, and a quinophthalone pigment. Examples of the dye chelate include basic dye chelate and acidic dye chelate.

Examples of inorganic pigment include titanium oxide, iron oxide, calcium carbonate, barium sulfate, aluminum hydroxide, barium yellow, cadmium red, chromium yellow, and carbon black. Of these, carbon black is particularly preferable. Examples of carbon black include those produced by a known method such as a contact method, a furnace method, or a thermal method.

Specific examples of the pigment which may be used in the invention include pigment disclosed in paragraphs [0142] to [0145] of JP-A No. 2007-100071.

Single type of the pigments may be used alone, or a combination of two or more thereof may be used.

The content of the pigments in the ink composition is preferably from 0.1 to 20% by mass, and more preferably from 0.2 to 15% by mass, with respect to the total solid mass of the ink composition, from the viewpoints of ink coloring property, storage stability, and the like.

<Polymerizable Compound (C)>

The active energy ray-curable ink composition of the invention contains a polymerizable compound (C). The polymerizable compound to be used may be a known polymerizable compound. It is preferable that the polymerizable compound used in the invention includes, but not limited to, at least one water-soluble compound including an ethylenic unsaturated bond.

—Water-soluble Compound Including Ethylenic Unsaturated Bond—

The compound including an ethylenic unsaturated bond may be any compound as long as it is a water-soluble compound including at least one ethylenic unsaturated bond that enable radical polymerization in a molecule thereof, and may take a chemical form of a monomer, an oligomer, a polymer, or the like.

The "water-soluble" means, but not limited, such a compound that 2% mass or more thereof dissolves in distilled water at 25° C.

Only one type of compound including an ethylenic unsaturated bond may be used, or a combination of two or more thereof in arbitrary proportions may be used in order to improve an intended property. It is preferable to use a combination of two or more thereof for controlling the properties such as reactivity and physical properties. From the viewpoint of ejection stability of ink, it is preferable to use a compound that favorably dissolves in water and tends not to precipitate in the ink composition.

Examples of the compound including an ethylenic unsaturated bond include: unsaturated carboxylic acids such as acrylic acid, methacrylic acid, itaconic acid, crotonic acid, isocrotonic acid, or maleic acid, and ester derivatives and salts thereof; (meth)acrylamide and derivatives thereof; an anhydride including an ethylenic unsaturated group; acrylonitrile, styrene, various unsaturated polyester, unsaturated polyether, unsaturated polyamide, unsaturated urethane, vinyl ether, and allyl ether. Among these, at least one selected from the group consisting of acrylic acid and methacrylic acid, and ester derivatives and salts thereof, and (meth)acrylamide and derivatives thereof is preferable, and it is more preferable to use at least one of (meth)acrylate and (meth)acrylamide and derivatives thereof, such as a monoester of acrylic acid or methacrylic acid (hereinbelow, may be referred to as "monoacrylate"), an ester of acrylic acid or methacrylic acid and a polyol compound (hereinbelow, may be referred to as "polyfunctional acrylate monomer" or "polyfunctional acrylate oligomer"). Herein, (meth)acrylate refers to acrylate and methacrylate. It is particularly preferable that the compound including an ethylenic unsaturated bond is (meth)acrylamide or (meth)acrylate.

The compound including an ethylenic unsaturated bond to be used in the invention is preferably has at least one of an oligo- or poly(alkyleneoxy) chain, an alkyl group having 10 or less carbon atoms, an acidic group (e.g., a carboxyl group, a sulfo group, a phosphoric acid group, or a salt thereof), a basic group (e.g., an amine or a salt thereof), and a hydroxyl group, from the viewpoint of imparting water solubility.

When the compound including an ethylenic unsaturated bond has an oligo- or poly(alkyleneoxy) chain, the number of alkyleneoxy units is preferably from 1 to 10, and more preferably from 1 to 5. When the number of units is 10 or less, hardness of a cured film, adhesiveness to a recording medium, and the like are improved.

The carbon number of the alkyleneoxy group in the oligo- or poly(alkyleneoxy) chain is preferably from 2 to 4, and more preferably 2 or 3.

Among the compounds including an ethylenic unsaturated bond, specific examples of monoacrylate, polyfunctional acrylate monomers, polyfunctional acrylate oligomers and (meth)acrylamide derivatives include compounds having the structures shown below. However, the compound including an ethylenic unsaturated bond to be used in the invention is not limited thereto.

Exemplary Compound 2-1

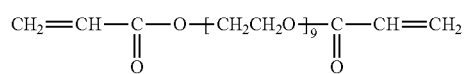

Exemplary Compound 2-2

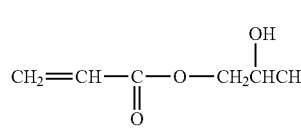

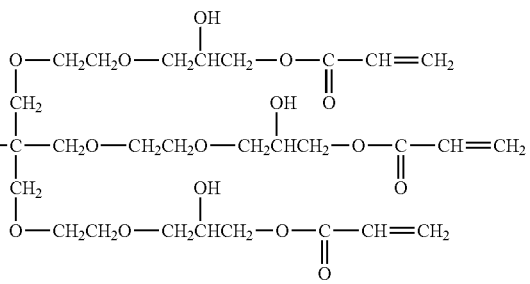

Exemplary Compound 2-3

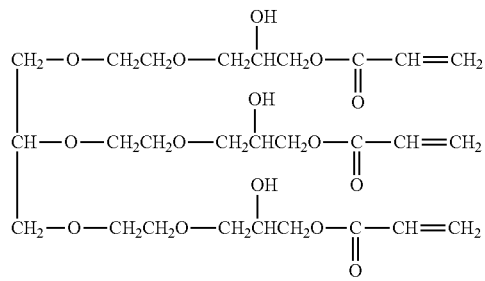

Exemplary Compound 2-4

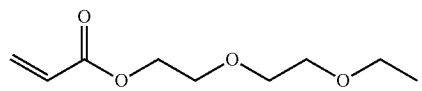

Exemplary Compound 2-5

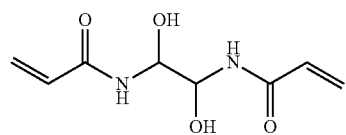

Exemplary Compound 2-6

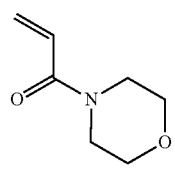

Exemplary Compound 2-7

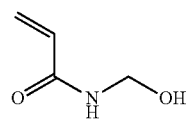

Exemplary Compound 2-8

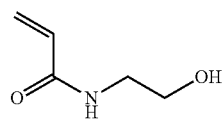

Exemplary Compound 2-9

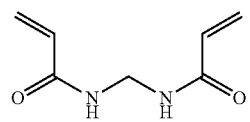

Exemplary Compound 2-10

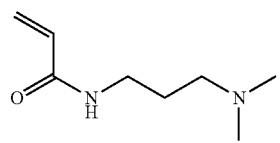

Exemplary Compound 2-11

Other than the exemplary compound shown above, compounds including an ionic group, such as methacrylic acid or a potassium salt of 3-sulfopropyl acrylate may be used.

In the invention, one type of compound including an ethylenic unsaturated bond may be used alone, or a combination of two or more thereof may be used.

In the invention, for further improving sensitivity, suppressing bleeding, and improving adhesiveness with a recording medium, it is preferable to use at least one monofunctional acrylate in combination with a polyfunctional acrylate monomer or a polyfunctional acrylate oligomer, as the compound including an ethylenic unsaturated bond.

Furthermore, an embodiment in which at least two types of compounds including an ethylenic unsaturated bond, at least one monofunctional monomer and at least one polyfunctional (i.e., di- or higher-function) monomer, are used, is preferable from the viewpoints of keeping safety and further improving sensitivity, suppressing bleeding, and improving adhesiveness with a recording medium.

The content of the polymerizable compounds in the ink composition of the invention is from 1 to 40% by mass, more preferably from 3 to 35% by mass, and further more preferably from 5 to 30% by mass, with respect to the total amount of the aqueous ink composition.

<Polymerization Initiator>

The active energy ray-curable ink composition of the invention may further contain a polymerization initiator. The polymerization initiator is not limited, and any polymerization initiator selected from known polymerization initiators may be used. Among polymerization initiators, a water-soluble polymerization initiator is preferable.

The extent of "water-solubility" of the polymerization initiator in the invention is such that 0.5% by mass or more, preferably 1% by mass or more, and particularly preferably 3% by mass or more of the polymerization initiator dissolves in distilled water at 25° C.

Among polymerization initiators, a polymerization initiator selected from the group consisting of an α-amino ketone compound and an acylphosphine oxide compound is preferable.

Examples of α-amino ketone compound include 2-methyl-1-phenyl-2-morpholinopropan-1-one, 2-methyl-1-[4-(hexyl)phenyl]-2-morpholinopropan-1-one, and 2-ethyl-2-dimethylamino-1-(4-morpholinophenyl)-butanone-1. Furthermore, IRGACURE series (trade name, manufactured by BASF Japan) such as IRGACURE 907, IRGACURE 369, or IRGACURE 379 are commercially available, and are included in examples of the α-amino ketone compound.

Examples of acylphosphine oxide compound include 2,4,6-trimethylbenzoyl-diphenyl-phosphine oxide, which is commercially available as DAROCUR TPO (trade name, manufactured by BASF Japan), and bis(2,4,6-trimethylbenzoyl)-phenylphosphine oxide, which is commercially available as IRGACURE 819 (trade name, manufactured by BASF Japan).

Specific examples of the water-soluble acylphosphine oxide compound include compounds disclosed in JP-A No. 2005-307199 (for example, Exemplary Compounds 5, 6, and 7), 2,4,6-trimethylbenzoyl-diphenyl-phosphine oxide (DAROCUR TPO (trade name, manufactured by BASF Japan)), and bis(2,4,6-trimethylbenzoyl)-phenylphosphine oxide (IRGACURE 819 (trade name, manufactured by BASF Japan)). Furthermore, preferable examples (Exemplary Compounds 1-1 to 1-3) of the water-soluble acylphosphine oxide are shown below. However, the invention is not limited thereto.

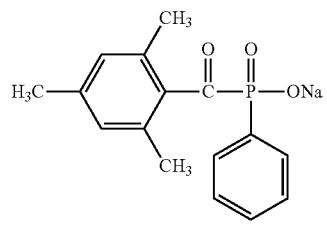

Exemplary Compound 1-1

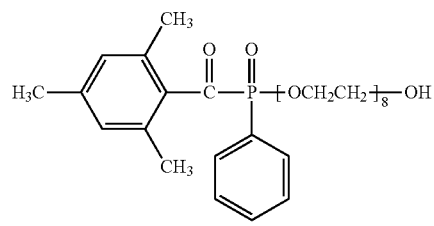

Exemplary Compound 1-2

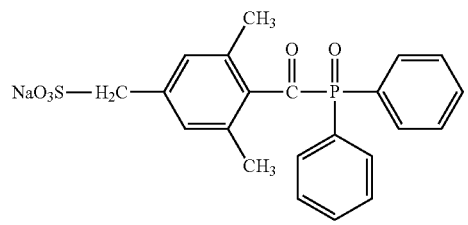

Exemplary Compound 1-3

As a polymerization initiator, a polymerization initiator other than the α-amino ketone compound and acylphosphine oxide compound may be used. Examples thereof include camphor quinine, benzophenone, a benzophenone derivative, acetophenone, an acetophenone derivative, such as α-hydroxycycloalkyl phenyl ketones or 2-hydroxy-2-methyl-1-phenyl-propanone, dialkoxyacetophenones, α-hydroxy- or 4-acryloyl-1,2-dioxolanes, benzoin alkyl ethers, and benzyl ketals;

such as benzyl dimethyl ketal, phenyl glyoxalate and derivatives thereof, phenyl glyoxalate dimer, peresters;

such as benzophenone tetracarboxylic acid peresters (for example, those disclosed in EP 1126541), halomethyl triazines, such as 2-[2-(4-methoxy-phenyl)-vinyl]-4,6-bis-trichloromethyl[1,3,5]triazine, 2-(4-methoxy-phenyl)-4,6-bis-trichloromethyl[1,3,5]triazine, 2-(3,4-dimethoxy-phenyl)-4,6-bis-trichloromethyl[1,3,5]triazine, 2-methyl-4,6-bis-trichloromethyl[1,3,5]triazine, hexaaryl bisimidazole/co-initiator system, such as ortho-chlorohexaphenyl-bisimidazole combined with 2-mercaptobenzothiazole; ferrocenium compounds or titanocenes;

for example, dicyclopentadienyl-bis(2,6-difluoro-3-pyrrolo-phenyl)titanium; such as O-acyl oxime ester compounds disclosed in GB 2,339,571. As a co-initiator, a boric acid compound may be used.

The content of the polymerization initiator in the ink composition is preferably from 0.5 to 10% by mass, more preferably from 1 to 8% by mass, and most preferably from 1 to 7% by mass, with respect to the total amount of the ink composition.

<Water>

The ink composition of the invention contains water. The water content is preferably from 1 to 70% by mass, more preferably from 2 to 60% by mass, and particularly preferably from 5 to 50% by mass, with respect to the total amount of the ink composition. The ink composition of the invention contains water, and may further contain a water-soluble organic medium described below. The water-soluble organic solvent may be contained as a dryness inhibitor or a penetration promoter.

The dryness inhibitor is preferably a water-soluble organic solvent having a vapor pressure lower than that of water. Specific examples of the dryness inhibitor include polyhydric alcohols exemplified by ethylene glycol, propylene glycol, diethylene glycol, polyethylene glycol, thiodiglycol, dithiodiglycol, 2-methyl1,3-propane diol, 1,2,6-hexanetriol, acetylene glycol derivatives, glycerin, and trimethylol propane;

lower alkyl ethers of polyhydric alcohols, such as ethylene glycol monomethyl ether or ethylene glycol monoethyl ether, diethylene glycol monomethyl ether or diethylene glycol monoethyl ether, or triethylene glycol monoethyl ether or triethylene glycol monobutyl ether; heterocyclic compounds such as 2-pyrrolidone, N-methyl-2-pyrrolidone, 1,3-dimethyl-2-imidazolidinone, or N-ethylmorpholine;

sulfur-containing compounds such as sulfolane, dimethylsulfoxide, or 3-sulfolene; and polyfunctional compounds and urea derivatives such as diacetone alcohol or diethanol amine. In particular, as a dryness inhibitor, a polyhydric alcohol such as glycerin or diethylene glycol is preferable. Only one type of dryness inhibitors may be used alone, or a combination of two or more thereof may be used.

The penetration promoter is preferably used for allowing favorable penetration of the ink into a recording medium (printing paper). Specific examples of the penetration promoter include alcohols such as ethanol, isopropanol, butanol, di- or tri-ethylene glycol monobutyl ether, or 1,2-hexane diol, and sodium lauryl sulfate, sodium oleate, and nonionic surfactants.

The water-soluble organic solvent may be used for other purposes, and may be used for controlling a viscosity. Specific examples of the water-soluble organic solvent which may be used for controlling a viscosity include alcohols such as methanol, ethanol, propanol, isopropanol, butanol, isobutanol, sec-butanol, t-butanol, pentanol, hexanol, cyclohexanol, or benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, or thiodiglycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, or ethylene glycol monophenyl ether; amines such as ethanol amine, diethanol amine, triethanol amine, N-methyldiethanol amine, N-ethyldiethanol amine, morpholine, N-ethyl morpholine, ethylene diamine, diethylene triamine, triethylene tetramine, polyethylene imine, or tetramethyl propylene diamine; and other polar solvents such as formamide, N,N-dimethylformamide, N,N-dimethyl acetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidionone, or acetone.

Only one type of the water-soluble organic solvents may be used alone, or a combination of two or more thereof may be used.

The content of the aqueous medium in the aqueous colorant dispersion of the invention is preferably from 1 to 70% by mass, from 2 to 60% by mass, and more preferably from 5 to 50% by mass.

When the content of the aqueous medium is within the above ranges, liquid physical properties, such as a drying speed of the colorant dispersion, penetration property to an object to be applied, and viscosity, are adjusted to appropriate conditions.

<Other Additives>

The components described above, the ink composition of the invention may further contain other additives if necessary. Examples of additives which may be additionally added include known additives such as a ultraviolet absorber, an anti-discoloration agent, a fungicide, a pH adjuster, a corrosion inhibitor, an antioxidant, an emulsion stabilizer, an antiseptic agent, a defoaming agent, a viscosity adjuster, a dispersion stabilizer, a chelate agent, or a surface tension adjuster.

As the anti-discoloration agent, various organic or metal complex anti-discoloration agents may be used. Examples of organic anti-discoloration agent include hydroquinones, alkoxyphenols, dialkoxyphenols, phenols, anilines, amines, indans, chromanes, alkoxyanilines, and heterocyclic compounds. Examples of metal complex anti-discoloration agent include a nickel complex and a zinc complex. Examples of antioxidant include phenol antioxidants (including hindered phenol antioxidants), amine antioxidants, sulfur-containing antioxidants, and phosphorus-containing antioxidants. Examples of surface tension adjuster include nonionic surfactants, cationic surfactants, anionic surfactants, and betaine surfactants. The amount of surface tension adjuster to be added is such that the surface tension of the ink composition is preferably adjusted to from 20 to 60 mN/m, more preferably from 20 to 45 mN/m, and further more preferably from 25 to 40 mN/m, from the viewpoint of favorable ejection by an inkjet system.

Specific examples of the additives include other additives disclosed in paragraphs [0153] to [0162] of JP-A No. 2007-100071 and the like.

The respective additives may be directly added after the ink composition has been prepared, or may be added to the ink composition during preparation thereof.

In addition to the above, the ink composition of the invention may further contain a surfactant.

The surfactant is preferably a compound having a structure having a hydrophilic moiety and a hydrophobic moiety in a molecule thereof, and any of anionic surfactants, cationic surfactants, amphoteric surfactants, and nonionic surfactants may be used. A high-molecular-weight compound (polymer dispersant) may be used as a surfactant.

Specific examples of anionic surfactants include sodium dodecyl benzene sulfonate, sodium lauryl sulfate, sodium alkyldiphenyl ether disulfonate, sodium alkyl naphthalene sulfonate, sodium dialkyl sulfosuccinate, sodium stearate, potassium oleate, sodium dioctyl sulfosuccinate, sodium polyoxyethylene alkyl ether sulfate, sodium polyoxyethylene alkyl ether sulfate, sodium polyoxyethylene alkyl phenyl ether sulfate, sodium dialkylsulfosuccinate, sodium stearate, sodium oleate, and sodium salt of t-octylphenoxyethoxy polyethoxyethyl sulfate.

Specific examples of nonionic surfactants include polyoxyethylene lauryl ether, polyoxyethylene octyl phenyl ether, polyoxyethylene oleyl phenyl ether, polyoxyethylene nonyl phenyl ether, oxyethylene-oxypropylene block copolymers, t-octylphenoxyethyl polyethoxy ethanol, and nonyl phenoxyethyl polyethoxyethanol.

Specific examples of cationic surfactants include tetraalkyl ammonium salts, alkyl amine salts, benzalkonium salts, alkyl pyridium salts, and imidazolium salts, and more specifically include dihydroxyethyl stearyl amine, 2-heptadecenyl-hydroxyethyl imidazoline, lauryl dimethylbenzyl ammonium chloride, cetyl pyridinium chloride, and stearamide methylpyridium chloride.

Only one type of surfactants may be used alone, or a combination of two or more thereof may be used. The content of the surfactant in the ink composition is not particularly limited, but is preferably 1% by mass or more, more preferably from 1 to 10% by mass, and further more preferably from 1 to 3% by mass.

In a case in which application of ink is carried out by an inkjet system, the viscosity of the ink composition is preferably from 1 to 30 mPa·S, more preferably from 1 to 20 mPa·S, further more preferably from 2.5 to 15 mPa·S, and most preferably from 2 to 10 mPa·S, from the viewpoints of ejection stability and aggregation speed. The viscosity of the ink composition may be measured, for example, using an E-type viscometer at 20° C.

The recording medium used in the invention is not particularly limited, and any known recording medium may be used. Examples of the recording medium include paper, paper laminated with plastic (such as polyethylene, polypropylene, or polystyrene), metal plates (which is made from aluminum, zinc, copper, or the like), plastic films (which is made from a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, or the like), and a paper sheet of plastic film having the metal mentioned above laminated or vapor-deposited thereon. Specifically, since the ink composition of the invention has an excellent adhesiveness, it may be preferably used for a non-absorbable recording medium as the recording medium. From the viewpoints of adhesiveness, a plastic base material made from polyvinyl chloride, polyethylene terephthalate, polyethylene, or the like is preferable, a polyvinyl chloride resin base material is more preferable, and a polyvinyl chloride resin sheet or film is further more preferable.

Production Method for Colorant Dispersion

In more detail, the colorant dispersion used for the ink composition of the invention may be produced by a production method including the steps (1) and (2) described below. However, the invention is not limited thereto.

Step (1): a step in which a mixture containing water and a solution (III) that contains water as a main component and the (A) colorant, the (B) dispersant, the (D) organic solvent capable of dissolving or dispersing the (B) dispersant, and a basic substance, is subjected to a dispersion treatment.

Step (2): a step in which the (D) organic solvent is removed.

In the step (1), the (B) dispersant is first dissolved or dispersed in the (D) organic solvent, thereby obtaining a mixture (II) thereof (mixing step). Next, a solution (III) containing water as a main component and containing the colorant (A) and the basic substance, water, and a surfactant if necessary, are added to the mixture (II), and mixed and subjected to a dispersion treatment, thereby obtaining an oil-in-water colorant dispersion.

The neutralization degree is not particularly limited. In general, it is preferable that the solution of the finally-obtained colorant dispersion is neutral, for example, having a pH of from 4.5 to 10. The pH may be determined according to a desired neutralization degree of the water-insoluble vinyl polymer.

The (A) colorant, (B) dispersant, and other additives used in the method of producing a colorant dispersion have the same definitions as those mentioned in the context of the ink composition, and preferable examples thereof are also the same.

Preferable examples of the (D) organic solvent used in the invention include alcohol solvents, ketone solvents, and ether solvents. Specifically, examples of alcohol solvents include ethanol, isopropanol, n-butanol, tertiary butanol, isobutanol, and diacetone alcohol. Examples of ketone solvents include acetone, methyl ethyl ketone, diethyl ketone, and methyl isobutyl ketone. Examples of ether solvents include dibutyl ether, tetrahydrofuran, and dioxane. Of these solvents, isopropanol, acetone, and methyl ethyl ketone are preferable, and methyl ethyl ketone is particularly preferable.

Only one type of (D) organic solvents may be used alone, of a combination of plural types thereof may be used.

In the production of the colorant dispersion, a kneading dispersion treatment may be carried out by applying a strong shear force using a two spindle roller, a three spindle roller, a ball mill, a trommel, a disper, a kneader, a co-kneader, a homogenizer, a blender, a single screw or double screw extruder, or the like.

Details of kneading and dispersing are disclosed in T. C. Patton, "Paint Flow and Pigment Dispersion" (1964, John Wiley and Sons) and the like.

If necessary, the colorant dispersion may be obtained by carrying out a fine dispersing treatment with beads (having a particle diameter of 0.01 mm to 1 mm) made of glass, zirconia, or the like using a vertical type or horizontal type sand grinder, a pin mill, a slit mill, an ultrasonic dispersion apparatus or the like.

In the method of producing a colorant dispersion, the manner of removing the organic solvent is not particularly limited, and the organic solvent may be removed by any known method such as reduced-pressure distillation.

The colorant obtained by the method of producing a colorant dispersion preferably has an average particle diameter of 10 nm or more and less than 200 nm, more preferably 50 nm or more and less than 130 nm, and further more preferably 60 nm or more and less than 100 nm. An average particle diameter within the above ranges is preferable from the viewpoints that color development, dispersion stability, and ejection stability at the time of jetting are improved.

The average particle diameter of the dispersed particles of the colorant is indicated by the value measured by dynamic light scattering method.

Inkjet Recording Method

Hereinbelow, the inkjet recording method of the invention, and an inkjet recording apparatus usable for the inkjet recording method are described.

The inkjet recording method of the invention includes: a process of ejecting an active energy ray-curable ink composition onto a recording medium using an inkjet recording apparatus; and a process of irradiating the ejected ink composition with an active energy ray to cure the ink composition.

Since the inkjet recording method of the invention includes the above-mentioned processes, an image is formed from the ink composition which has been cured on the recording medium.

For the process of ejecting the active energy ray-curable ink composition using an inkjet recording apparatus in the inkjet recording method of the invention, an inkjet recording apparatus described in detail below may be used.

—Inkjet Recording Apparatus—

The inkjet recording apparatus used in the inkjet recording method of the invention is not particularly limited, and a known inkjet recording apparatus capable of achieving an intended resolution may be arbitrary selected and used. In other words, any one of known inkjet recording apparatuses including commercially-available products may be used for ejecting an ink onto a recording medium in the process of ejecting the active energy ray-curable ink composition using an inkjet recording apparatus in the inkjet recording method of the invention.

Examples of inkjet recording apparatus usable in the invention include an apparatus equipped with an ink supply system, a temperature sensor, and an active energy ray source.

The ink supply system has, for example, a base tank that houses the ink composition of the invention, a supply pipe, an ink supply tank that is arranged at a position adjacent to (a position before) an inkjet head, a filter, and a piezo-type inkjet head. The piezo-type inkjet head is capable of moving and ejecting multi-sized dots of 1 to 100 pl, and preferably 8 to 30 pl, at a resolution of 320×320 dpi to 4000×4000 dpi, preferably 400×400 dpi to 1600×1600 dpi, and more preferably 720×720 dpi. Herein, "dpi" as used in the invention indicates the number of dots per 2.54 cm.

It is desirable to maintain the temperature of an active energy ray-curable ink composition such as the ink composition of the invention at a certain temperature. In this regard, parts of the inkjet recording apparatus from the ink supply tank to the inkjet head may be insulated from heat or may be heated. The method of controlling the temperature is not particularly limited, but it is preferable to place temperature sensors at plural positions on the pipe, and control the heating in accordance with the ink flow rate and environment temperature, for example. A temperature sensor may be placed at a position near the ink supply tank and the nozzle of the inkjet head. Furthermore, it is preferable that the head unit to be heated is thermally insulated so as not to be affected by the outside temperature of the apparatus body. In order to reduce the printer star-up time necessary for heating, or to reduce the loss in thermal energy, it is preferable to reduce the thermal capacity of the entire heating unit, simultaneously with thermal insulation from other parts.

The ejection of the active energy ray-curable ink composition of the invention using the inkjet recording apparatus is preferably carried out after the viscosity of the ink composition is decreased to preferably from 5 to 30 mPa·s, and more preferably from 7 to 25 mPa·s by heating the ink composition to preferably 25 to 60° C., and more preferably from 25 to 50° C. In particular, the ink composition of the invention preferably has an ink viscosity at 25° C. of from 35 to 500 mPa·s because a significant effect is attained. By this method, an excellent ejection property can be achieved.

Since the active energy ray-curable ink composition such as the ink composition of the invention generally has a higher viscosity than that of an aqueous ink commonly used in inkjet recording, viscosity fluctuation due to the temperature change upon ejection is significant. The ink viscosity fluctuation significantly affects the changes in droplet size and droplet ejection speed, leading to image quality deterioration. Therefore, the temperature of the ink upon ejection has to be maintained at a certain temperature as well as possible. Accordingly, in the invention, it is appropriate to control the ink temperature within a range ±5° C. of a preset temperature, preferably within a range ±2° C. of a preset temperature, and more preferably within a range ±1° C. of a preset temperature.

Next, description is given to the process of irradiating the ejected ink composition with an active energy ray to cure the ink composition.

The ink composition ejected on a recording medium is cured when irradiated with an active energy ray. This is because the radical polymerization initiator included in the ink composition of the invention is decomposed by the irradiation with an active energy ray to generate an initiation species such as a radical, and the initiation species functions to initiate and promote the polymerization reaction of the polymerizable compound. When a sensitizing dye is co-exist with the radical polymerization initiator in the ink composition, the sensitizing dye in the system becomes excited by absorbing the active energy ray. The sensitizing dye promotes the decomposition of the radical polymerization initiator when brought into contact therewith. Thus, a curing reaction at a higher sensitivity is achieved.

The polymerization initiator system usable in the ink composition of the invention is one that has satisfactory sensitivity to an active energy ray at a lower output power. The output power of the active energy ray is preferably 2,000 mJ/cm$^2$ or less, more preferably from 10 to 2,000 mJ/cm$^2$, further more preferably from 20 to 1,000 mJ/cm$^2$, and particularly preferably from 50 to 800 mJ/cm$^2$.

It is appropriate that the active energy ray is applied under such a condition that the illuminance at the exposure surface is from 10 to 2,000 mW/cm$^2$, and preferably from 20 to 1,000 mW/cm$^2$.

As an active energy ray source, a mercury lump, a gas laser, a solid laser, or the like is mainly used. As a light source used for curing an active energy ray-curable ink composition, a mercury lump or a metal halide lump is widely known. However, avoidance of mercury has been strongly demanded from the viewpoint of environmental preservation. Thus, shift for GaN semiconductor ultraviolet-emitting devices is extremely useful from industrial and environmental viewpoints. Furthermore, LEDs (UV-LEDs) and LDs (UV-LDs) have been expected for serving as a photocurable inkjet light source because they have small sizes and long life, while being highly efficient and inexpensive.

Light-emitting diodes (LEDs) and laser diodes (LDs) may be used as the active energy ray source. When an ultraviolet source is required, an ultraviolet LED or ultraviolet LD may be used. For example, an ultraviolet LED having a main spectrum between 365 nm and 420 nm is commercially available from Nichia Corporation. When further shorter wavelength is required, U.S. Pat. No. 6,085,250 discloses an LED capable of emitting an active energy ray having a main wavelength between 300 nm and 370 nm. Other ultraviolet LEDs are available, and radiations of different wavelength in an ultraviolet range may be applied. In the invention, the active energy ray source is preferably a UV-LED, and particularly preferably a UV-LED having a peak wavelength at from 350 nm to 420 nm.

The maximum illuminance of an LED on a recording medium is preferably from 10 to 2,000 mW/cm$^2$, more preferably from 20 to 1,000 mW/cm$^2$, and particularly preferably from 50 to 800 mW/cm$^2$.

It is appropriate that the ink composition of the invention is irradiated with such an active energy ray for, for example, 0.01 second to 120 seconds, and preferably for 0.1 second to 90 seconds.

Irradiation conditions of an active energy ray and basic irradiation method are disclosed in JP-A No. 60-132767. Specifically, light sources are arranged at both sides of a head unit including the ink ejection device, and the head unit and light sources are moved in a so-called shuttle manner. The application of an active energy ray is carried out after a certain time passed (for example, 0.01 to 0.5 second, preferably 0.01 to 0.3 second, and more preferably 0.01 to 0.15 second) after the ink impaction. By controlling the time gap between the ink impaction and light irradiation to extremely short, as described above, the ink impacted to the recording medium is capable of being prevented from bleeding before it cures. Furthermore, even when a porous recording material is used, light exposure may be carried out before the ink penetrates into a deep portion of the recording medium at which the light cannot reach, and less monomers may be left unreacted, leading to reduction in odor.

Meanwhile, another light source that does not move may be used for curing. WO 99/54415 discloses, as an irradiation method, a method using an optical fiber, and a method in which a collimated light source is applied to a mirror surface arranged at a side surface of a head unit to apply UV light to a recording region. Such curing methods are applicable to the inkjet recording method of the invention.

By using the inkjet recording method as described above, constant dot diameters of impacted ink are maintained even when various recording media having different surface wettability are used, and image quality is improved. In order to obtain a color image, it is preferable to superimposing inks in the order of brightness beginning with a low brightness to a higher brightness. By superimposing inks in the order of brightness beginning with a low brightness, a radiation tends to easily reach the underlying ink, and improvement in curing sensitivity, reduction in residual monomers, reduction in odor, an improvement in adhesiveness are expected. Furthermore, all colors may be exposed to light at once, it is preferable to carry out light exposure for each color from the viewpoint of promotion of curing.

As described above, the ink composition of the invention is capable of being cured at a high sensitivity by irradiation with an active energy ray, and an image with a high strength can be formed. Furthermore, an image having an excellent adhesiveness to a recording medium can be formed.

EXAMPLES

Hereinbelow, the present invention is described in further detail by referring to examples. However, the present invention is not restricted by the examples described below.

Synthesis Example 1

Synthesis of Polymer P-1

First, 55 g of methyl ethyl ketone was added to a 500 ml-three necked flask equipped with a stirrer and a condenser, and heated to 75° C. under a nitrogen atmosphere. To the flask, a solution obtained by dissolving 40.8 g (0.231 molar equivalent) of benzyl methacrylate, 4.8 g (0.056 molar equivalent) of methacrylic acid, and 2.4 g (0.008 molar equivalent) of BLEMMER PE-200 (trade name, manufactured by NOF Corporation) as monomers for forming a dispersant, and 1.2 g of dimethyl-2,2'-azobis isobutyrate as an initiator in 55 g of methyl ethyl ketone was added by dropping over 3 hours. After completion of the adding, the obtained mixture was left stand for 1 hour for reaction, a solution obtained by dissolving 0.36 g of dimethyl-2,2'-azobis isobutyrate in 2 g of methyl ethyl ketone was added thereto, and the obtained mixture was heated at 78° C. for 4 hours. The obtained reaction solution was subjected to precipitation twice with an excess amount of hexane, and the precipitated polymer was dried, thereby obtaining 43 g of Polymer (P-1).

The composition of the obtained polymer was confirmed by $^1$H-NMR, and the weight average molecular weight (Mw) thereof obtained by GPC was 29,000.

Other dispersants, i.e., Polymers (P-2) to (P-8), were synthesized in the same manner as in the synthesis of Dispersant (P-1), except that benzyl methacrylate, methacrylic acid, and BLEMMER PE-200 used in the synthesis of Dispersant (P-1) were changed to the monomers shown in Tables 1 to 4, and the amounts of the monomers were appropriately changed to the mass ratios shown in Tables 1 to 4, respectively. Three-component dispersants were obtained by combining three types of monomers as described above. Four- or five-component dispersants were obtained by combining four or five types of monomers in the same manner as above.

The molecular weight was controlled by adjusting the amount of dimethyl-2,2'-azobis isobutyrate, which is an initiator, added to the reaction system.

Comparative dispersants, i.e., Polymers (P-7) and (P-8), were each synthesized in a similar manner as in Synthesis Example 1, except that the monomers used in the synthesis of Dispersant (P-1) were changed to the monomers shown in Table 4, and the amounts of the monomers were changed to the mass ratios shown in Table 4, respectively.

(Preparation of Pigment-Containing Resin Particle Dispersion (Colorant Dispersion (D-1))

First, 10 parts by mass of Pigment Blue 15:3 (PB 15:3) (PHTHALOCYANINE BLUE-A220, trade name, manufactured by Dainichiseika Color & Chemicals Mfg. Co., Ltd.), 5 parts by mass of Dispersant (P-1) obtained as described above, 42 parts by mass of methyl ethyl ketone, 5.5 parts by mass of 1N aqueous NaOH solution, and 87.2 parts by mass of ion-exchange water were mixed, and then subjected to a dispersion treatment for 2 to 6 hours in a beads mill using 0.1 mmφ zirconia beads.

Methyl ethyl ketone was removed from the obtained dispersion at 55° C. under a reduced pressure, and a part of water was removed therefrom, thereby obtaining a pigment (colorant) dispersion in which a pigment concentration was 10.2% by mass. The pigment dispersion was subjected to centrifugation using a centrifugation apparatus (trade name: 05P-21, manufactured by Hitachi, Ltd.) at 5,000 rpm for 30 minutes. Ion-exchanged water was added thereto so as to make a pigment concentration 15% by mass, thereby obtaining a pigment dispersion solution. The pigment dispersion solution was subjected to pressure filtration using a 2.5 µm-membrane filter (manufactured by Advantec MFS. Ltd.), and ion-exchange water was added thereto so as to make a pigment concentration 4% by mass, thereby obtaining Colorant dispersion (D-1) of the present invention.

Pigment dispersions (D-2) to (D-8) were obtained in the same manner as above except that Polymer (P-1) used for the pigment dispersion was changed to Polymers (P-2) to (P-8), respectively. The weight average molecular weights and molecular distributions are shown in Tables 1 to 4.

TABLE 1

| Pigment Dispersion | Polymer | Monomer capable of forming a repeating unit | | Repeating unit | Content (wt %) | Weight average molecular weight (*10$^{-3}$) | Molecular weight distribution | Remarks |
|---|---|---|---|---|---|---|---|---|
| D-1 | P-1 | Benzyl methacrylate | 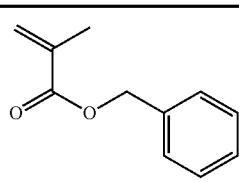 | a | 85 | 29,000 | 2.5 | Present invention |

TABLE 1-continued

| Pigment Dispersion | Polymer | Monomer capable of forming a repeating unit | | Repeating unit | Content (wt %) | Weight average molecular weight (*10⁻³) | Molecular weight distribution | Remarks |
|---|---|---|---|---|---|---|---|---|
| | | Methacrylic acid | 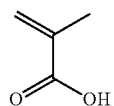 | b | 12 | | | |
| | | PE-200 | 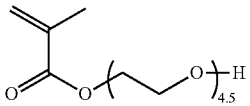 | c | 3 | | | |
| D-2 | P-2 | Phenoxy ethyl methacrylate | 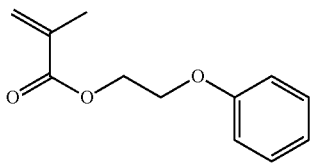 | a | 50 | 120,000 | 2.8 | Present invention |
| | | Methacrylic acid | 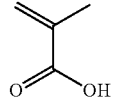 | b | 20 | | | |
| | | PME-200 | 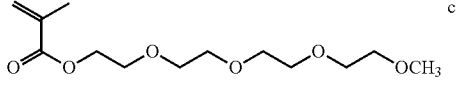 | c | 15 | | | |
| | | Methyl methacrylate | 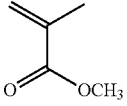 | Hydrophilic repeating unit other than repeating unit a | 15 | | | |

TABLE 2

| Pigment Dispersion | Polymer | Monomer capable of forming a repeating unit | | Repeating unit | Content (wt %) | Weight average molecular weight (*10⁻³) | Molecular weight distribution | Remarks |
|---|---|---|---|---|---|---|---|---|
| D-3 | P-3 | A-13 | 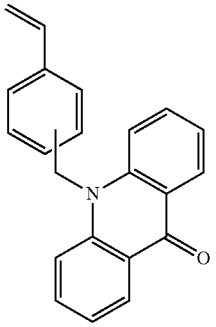 | a | 5 | 6,000 | 1.9 | Present invention |
| | | Phenoxy ethyl methacrylate | 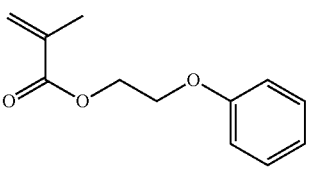 | a | 20 | | | |

TABLE 2-continued

| Pigment Dispersion | Polymer | Monomer capable of forming a repeating unit | | Repeating unit | Content (wt %) | Weight average molecular weight (*10$^{-3}$) | Molecular weight distribution | Remarks |
|---|---|---|---|---|---|---|---|---|
| | | Acrylic acid | 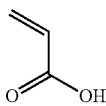 | b | 8 | | | |
| | | BLEMMER GLM | 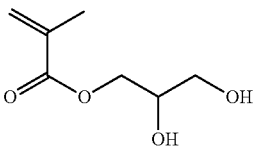 | c | 22 | | | |
| | | Methyl methacrylate | 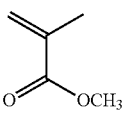 | Hydrophilic repeating unit other than repeating unit a | 45 | | | |
| D-4 | P-4 | A-18 | 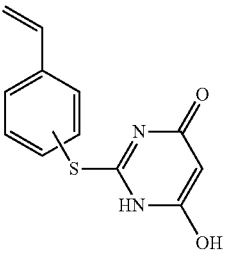 | a | 60 | 180,000 | 3.8 | Present invention |
| | | p-Styrene sulphonic acid | 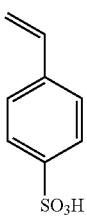 | b | 30 | | | |
| | | Hydroxyethyl methacrylate | 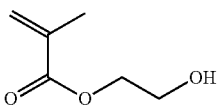 | c | 10 | | | |

TABLE 3

| Pigment Dispersion | Polymer | Monomer capable of forming a repeating unit | | Repeating unit | Content (wt %) | Weight average molecular weight (*10$^{-3}$) | Molecular weight distribution | Remarks |
|---|---|---|---|---|---|---|---|---|
| D-5 | P-5 | Styrene | 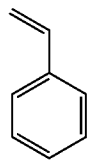 | a | 60 | 40,000 | 1.9 | Present invention |
| | | Dimethyl-aminoethyl methacrylate | 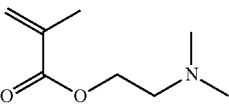 | b | 5 | | | |

TABLE 3-continued

| Pigment Dispersion | Polymer | Monomer capable of forming a repeating unit | Repeating unit | Content (wt %) | Weight average molecular weight ($*10^{-3}$) | Molecular weight distribution | Remarks |
|---|---|---|---|---|---|---|---|
| | | N-isopropyl acrylamide | c | 30 | | | |
| | | Butyl acrylate | Hydrophilic repeating unit other than repeating unit a | 5 | | | |
| D-6 | P-6 | Styrene | a | 35 | 2,000 | 3 | Present invention |
| | | Morpholinoethyl methacrylate | b | 30 | | | |
| | | Acrylamide | c | 35 | | | |

TABLE 4

| Pigment Dispersion | Polymer | Monomer capable of forming a repeating unit | Repeating unit | Content (wt %) | Weight average molecular weight ($*10^{-3}$) | Molecular weight distribution | Remarks |
|---|---|---|---|---|---|---|---|
| D-7 | P-7 | Cyclohexyl methacrylate | b | 20 | 230,000 | 4.5 | Comparative example |
| | | Carboxyethyl acrylate | c | 20 | | | |
| | | PME-1000 | c | 60 | | | |

TABLE 4-continued

| Pigment Dispersion | Polymer | Monomer capable of forming a repeating unit | | Repeating unit | Content (wt %) | Weight average molecular weight (*10⁻³) | Molecular weight distribution | Remarks |
|---|---|---|---|---|---|---|---|---|
| D-8 | P-8 | Phenoxy ethyl methacrylate | 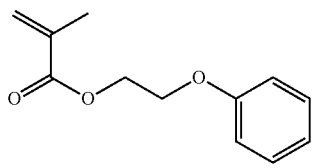 | a | 50 | 45,000 | 2.2 | Comparative example |
| | | Methacrylic acid | 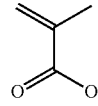 | b | 25 | | | |
| | | Methyl methacrylate | 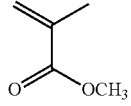 | Hydrophilic repeating unit other than repeating unit a | 40 | | | |

In Tables 1 to 4, an abbreviation PE-200 indicates polyethylene glycol monomethacrylate (trade name: BLEMMER PE-200, manufactured by NOF Corporation), an abbreviation PME-200 indicates methoxypolyethylene glycol monomethacrylate (trade name: BLEMER PME-200, manufactured by NOF Corporation), an abbreviation BLEMMER GLM indicates glycerin monomethacrylate (trade name: BLEMMER GLM, manufactured by NOF Corporation), and an abbreviation PME-1000 indicates methoxypolyethylene glycol monomethacrylate (trade name: BLEMMER PME-1000, manufactured by NOF Corporation).

(Preparation of Active Energy Ray-Curable Ink Composition (S-1))

An active energy ray-curable ink composition having the following formulation was prepared using Pigment dispersion (D-1) obtained as described above. The obtained composition was referred to as Ink composition (S-1).

| | |
|---|---|
| Pigment dispersion (D-1) | 40 parts by mass |
| Exemplary compound 1-1 (polymerization initator having the structure shown below) | 3 parts by mass |
| Exemplary compound 2-1 (polymerizable compound having the structure shown below) | 10 parts by mass |
| Exemplary compound 2-8 (polymerizable compound having the structure shown below) | 10 parts by mass |
| Glycerin | 7 parts by mass |
| Diethylene glycol | 9 parts by mass |
| Triethanol amine | 1 part by mass |
| OLFINE E1010 (trade name, manufactured by Nissin Chemical Co., Ltd.) | 1 part by mass |
| Triethylene glycol monobutyl ether | 9 parts by mass |
| Ion-exchange water | Balance |

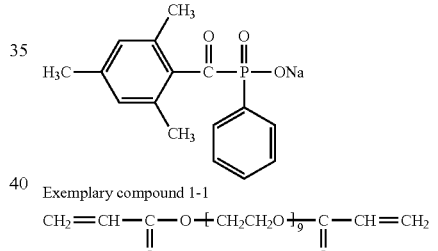

Exemplary compound 1-1

$CH_2{=}CH{-}\overset{O}{\underset{\|}{C}}{-}O{-}(CH_2CH_2O)_9{-}\overset{O}{\underset{\|}{C}}{-}CH{=}CH_2$ Exemplary compound 2-1

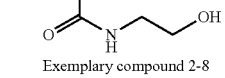

Exemplary compound 2-8

Ink compositions (S-2) to (S-10) were prepared in accordance with the preparation method for ink composition (S-1), except that the components were changed as shown in the following table.

TABLE 5

| | Ink | | | | | | | | | |
|---|---|---|---|---|---|---|---|---|---|---|
| | S-1 Example 1 | S-2 Example 2 | S-3 Example 3 | S-4 Example 4 | S-5 Example 5 | S-6 Example 6 | S-7 Example 7 | S-8 Comparative example 1 | S-9 Comparative example 2 | S-10 Comparative example 3 |
| Pigment dispersion (D-1)*¹ | 40(2) | | | | | | | | | |
| Pigment dispersion (D-2)*¹ | | 40(2) | | | | | | | | |
| Pigment dispersion (D-3)*¹ | | | 40(2) | | | | | | | |
| Pigment dispersion (D-4)*¹ | | | | 40(2) | | | 40(2) | | | |
| Pigment dispersion (D-5)*¹ | | | | | 40(2) | | | | | 40(2) |
| Pigment dispersion (D-6)*¹ | | | | | | 40(2) | | | | |

TABLE 5-continued

|  | Ink | | | | | | | | | |
|---|---|---|---|---|---|---|---|---|---|---|
|  | S-1 Example 1 | S-2 Example 2 | S-3 Example 3 | S-4 Example 4 | S-5 Example 5 | S-6 Example 6 | S-7 Example 7 | S-8 Comparative example 1 | S-9 Comparative example 2 | S-10 Comparative example 3 |
| Pigment dispersion (D-7)*[1] |  |  |  |  |  |  |  | 40(2) |  |  |
| Pigment dispersion (D-8)*[1] |  |  |  |  |  |  |  |  | 40(2) |  |
| Exemplary compound 1-1*[2] | 3 | 3 | 3 | 3 | 3 | 3 | 3 | 3 | 3 | 3 |
| Exemplary compound 2-1*[3] | 10 | 5 | 5 | 10 | 20 | 5 |  | 15 | 15 |  |
| N-Vinyl pyrrolidone*[3] |  |  |  |  |  |  | 20 |  |  |  |
| Exemplary compound 2-8*[3] | 10 | 15 | 15 | 10 |  | 15 |  | 5 | 5 |  |
| Glycerin*[4] | 7 | 7 | 7 | 7 | 7 | 7 | 7 | 7 | 7 | 7 |
| Diethylene glycol*[4] | 9 | 9 | 9 | 9 | 9 | 9 | 9 | 9 | 9 | 9 |
| Triethanolamine*[4] | 1 | 1 | 1 | 1 | 1 | 1 | 1 | 1 | 1 | 1 |
| Triethylene glycol monobutyl ether*[4] | 9 | 9 | 9 | 9 | 9 | 9 | 9 | 9 | 9 | 9 |
| OLFINE E1010*[5] | 1 | 1 | 1 | 1 | 1 | 1 | 1 | 1 | 1 | 1 |
| Ion-exchange water*[6] | Balance | Balance | Balance | Balance | Balance | Balance | Balance | Balance | Balance | Balance |

*[1]colorant dispersant
*[2]polymerization initiator
*[3]polymerizable compound
*[4]organic solvent
*[5]surfactant
*[6]water In Table 5, the numerals written in the parenthesis in the Pigment dispersion cells refer to the content of the dispersant in the pigment dispersions, respectively. It should be noted that a blank cell indicates that the ink composition does not contain the corresponding component.

<Inkjet Recording Method>

OK TOPCOAT+(recording medium) (trade name, manufactured by Oji Paper Co., Ltd.) was fixed on a stage that is capable of moving at 500 mm/second. Then, solid images were printed thereon using Ink compositions (S-1) to (S-10), respectively, in a line system with a GEL JET GX5000 printer head (trade name, manufactured by Ricoh Company) that was arranged at an angle of 75.5° with respect to the scanning direction of the stage, under the following conditions: a resolution of 1200×1200 dpi, and an ink ejection amount of 2.4 pL. Immediately after the printing, the ink compositions were dried at 60° C. for 3 seconds, and then exposed to light at an exposure amount of 2.5 J/cm$^2$ using a UV lump (trade name: METAL HALIDE LAMP, manufactured by EYE GRAPHICS Co., Ltd., peak of irradiation wavelength: 365 nm) for fixation, thereby obtaining a printed sample.

[Evaluation of Pigment Dispersion (Colorant Dispersion)]

Measurement of Average Particle Diameter

The volume average particle diameters of the obtained pigment dispersions were measured by dynamic light scattering method using a Nanotrac particle size distribution analyzer UPA-EX 150 (trade name, manufactured by Nikkiso Co., Ltd.). The results are shown in the following table. Measurement conditions were such that 10 cc of ion-exchange water was added to 10 μl of dispersion to prepare a solution for measurement, and the measurement was carried out at 25° C. Evaluation criteria were as described below.

Criteria

A: Average particle diameter of 70 nm or more and less than 100 nm

B: Average particle diameter of 100 nm or more and less than 130 nm

C: Average particle diameter of 130 nm or more and less than 200 nm

D: Average particle diameter of 200 or more (Evaluation of Adhesiveness to Substrate)

The A5-sized sample having the solid images on the entire surface thereof, which had been obtained by the inkjet recording method, was left standing for 72 hours under an environment of 25° C. and 50% RH. Thereafter, a 3 cm-strip of SCOTCH TAPE (registered trademark) (LP-12, trade name, manufactured by Nichiban Co., Ltd.) was attached onto the surface of the sample having the solid images thereon, and the SCOTCH TAPE (registered trademark) was peeled therefrom after 5 seconds. Then, the sample and the peeled SCOTCH TAPE (registered trademark) were visually observed, and evaluated in accordance with the following criteria.

Criteria

A: No color adhesion to the tape, with no deterioration of the solid images of the sample.

B: Color was adhered to the tape, but no deterioration of the solid images of the sample was observed.

C: Color was adhered to the tape, and deterioration of the solid images of the sample was observed.

D: Color was adhered on more than half of the entire area of the tape, and a part of the solid images of the sample was peeled off and paper surface was exposed.

(Evaluation of Film Strength)

The images of the printed sample obtained by the inkjet recording method was rubbed three strokes (back and forth) with a paperweight (weight: 470 g, size: 15 mm×30 mm×120 mm, load: equivalent to 260 kg/m$^2$) wound by OK TOPCOAT+(trade name, manufactured by Oji Paper Co., Ltd.), and image peeling was visually observed and evaluated in accordance with the following criteria.

It should be noted that, when image peeling was not observed after three strokes of rubbing, rubbing was continued up to sixth stroke.

The results are shown in the following table.

Criteria:

A: No image peeling was visually observed even after rubbing six strokes.

B: No image peeling was visually observed on the printed surface of the sample after rubbing four strokes, but image peeling was observed after rubbing six strokes.

C: No image peeling was visually observed on the printed surface of the sample after rubbing two strokes, but image peeling was observed after rubbing four strokes.

D: Image peeling was visually observed on the printed surface of the sample after rubbing two strokes.

TABLE 6

| Ink | Composition | Pigment dispersion Particle diameter (nm) | Ink composition Substrate adhesiveness | Ink composition Film strength |
|---|---|---|---|---|
| Example 1 | present invention | S-1 | A | A | A |
| Example 2 | present invention | S-2 | A | A | A |
| Example 3 | present invention | S-3 | A | B | A |
| Example 4 | present invention | S-4 | B | A | A |
| Example 5 | present invention | S-5 | B | B | A |
| Example 6 | present invention | S-6 | B | B | B |
| Example 7 | present invention | S-7 | B | A | B |
| Comparative example 1 | Comparative example | S-8 | D | C | D |
| Comparative example 2 | Comparative example | S-9 | B | D | C |
| Comparative example 3 | Comparative example | S-10 | B | D | D |

According to the invention, an active energy ray-curable ink composition may be provided, which is capable of providing a printed image having an excellent adhesiveness to a substrate and an excellent film strength.

Exemplary embodiments of the invention include, but are not limited to, the following.

<1> An active energy ray-curable ink composition comprising a colorant, a dispersant, a polymerizable compound and water, wherein the dispersant includes:

a hydrophobic repeating unit including a residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound;

a hydrophilic repeating unit including an ionic group; and
a hydrophilic repeating unit including a nonionic group.

<2> The active energy ray-curable ink composition according to <1>, wherein the hydrophobic repeating unit is represented by the following formula (1):

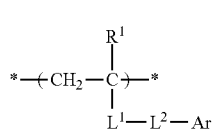

Formula (1)

wherein, in Formula (1), $R^1$ represents a hydrogen atom or a methyl group; $L^1$ represents a single bond, —COO—, —OCO—, —CONR$^2$—, or a phenylene group; $R^2$ represents a hydrogen atom or an alkyl group; $L^2$ represents a single bond, or at least one group selected from the group consisting of an alkylene group, an alkenylene group, —CO—, NR$^3$—, —O—, —S—, —SO— and —SO$_2$—; $R^3$ represents a hydrogen atom or an alkyl group; Ar represents a residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound; and * represents a binding position.

<3> The active energy ray-curable ink composition according to <1> or <2>, wherein the ionic group is an anionic group.

<4> The active energy ray-curable ink composition according to <3>, wherein the anionic group is at least one group selected from the group consisting of a carboxyl group, a phosphoric acid group and a sulfonic acid group.

<5> The active energy ray-curable ink composition according to any one of <1> to <4>, wherein the nonionic group is a group represented by —(R$^{11}$—O)$_n$—R$^{12}$, R$^{11}$ represents an alkylene group, R$^{12}$ represents an alkyl group or a hydrogen atom, and n represents an integer of from 1 to 6.

<6> The active energy ray-curable ink composition according to any one of <1> to <5>, wherein the residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound is represented by any one of following Formulae (W-1) to (W-15):

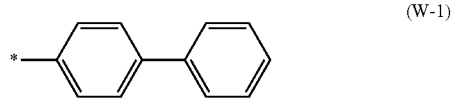

(W-1)

(W-2)

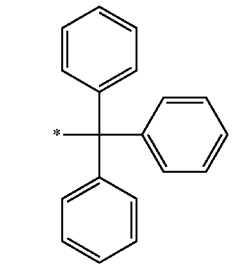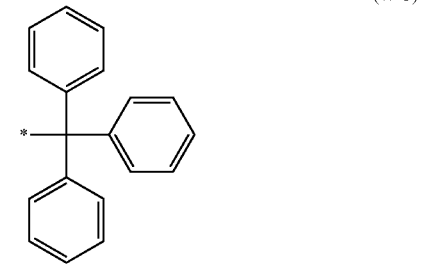

(W-3)

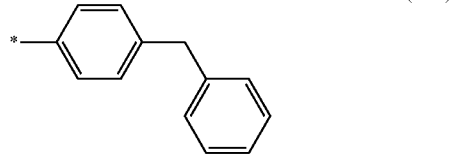

(W-4)

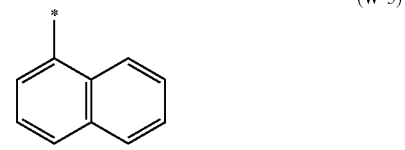

(W-5)

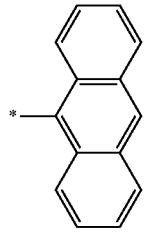

(W-6)

-continued

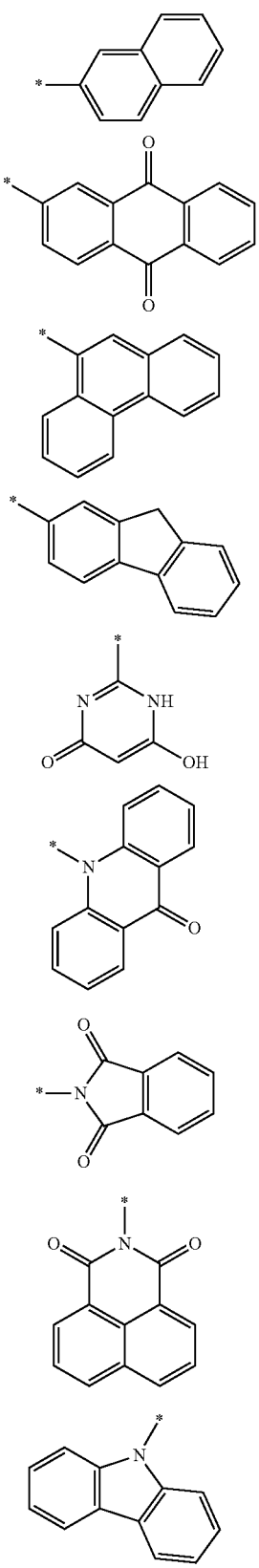

wherein, in Formulae (W-1) to (W-15), * represents a binding position.

<7> The active energy ray-curable ink composition according to any one of <1> to <6>, wherein the colorant is a pigment.

<8> The active energy ray-curable ink composition according to any one of <1> to <7>, wherein the polymerizable compound is selected from the group consisting of acrylamide, methacrylamide, acrylates and methacrylates.

<9> An inkjet recording method comprising:
ejecting the active energy ray-curable ink composition according to any one of <1> to <8> onto a recording medium using an inkjet recording apparatus; and
irradiating the ejected ink composition with an active energy ray to cure the ink composition.

<10> An inkjet printed article obtained by recording by the inkjet recording method according to <9>.

All publications, patent applications, and technical standards mentioned in this specification are herein incorporated by reference to the same extent as if each individual publication, patent application, or technical standard was specifically and individually indicated to be incorporated by reference.

What is claimed is:

1. An active energy ray-curable ink composition comprising a colorant, a dispersant, a polymerizable compound and water, wherein the dispersant includes:
a hydrophobic repeating unit including a residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound;
a hydrophilic repeating unit including an ionic group; and
a hydrophilic repeating unit including a nonionic group.

2. The active energy ray-curable ink composition according to claim 1, wherein the hydrophobic repeating unit is represented by following formula (1):

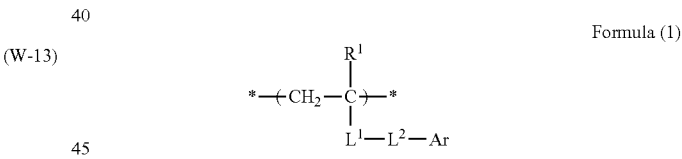

Formula (1)

wherein, in Formula (1), $R^1$ represents a hydrogen atom or a methyl group; $L^1$ represents a single bond, —COO—, —OCO—, —CONR$^2$—, or a phenylene group; $R^2$ represents a hydrogen atom or an alkyl group; $L^2$ represents a single bond, or at least one group selected from the group consisting of an alkylene group, an alkenylene group, —CO—, NR$^3$—, —O—, —S—, —SO— and —SO$_2$—; $R^3$ represents a hydrogen atom or an alkyl group; Ar represents a residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound; and
* represents a binding position.

3. The active energy ray-curable ink composition according to claim 1, wherein the ionic group is an anionic group.

4. The active energy ray-curable ink composition according to claim 3, wherein the anionic group is at least one group selected from the group consisting of a carboxyl group, a phosphoric acid group and a sulfonic acid group.

5. The active energy ray-curable ink composition according to claim 1, wherein the nonionic group is a group represented by $-(R^{11}-O)_n-R^{12}$, $R^{11}$ represents an alkylene group, $R^{12}$ represents an alkyl group or a hydrogen atom, and n represents an integer of from 1 to 6.

6. The active energy ray-curable ink composition according to claim 1, wherein the residue obtained by removing one hydrogen atom from a compound selected from the group consisting of a benzene ring-containing compound, an aromatic hydrocarbon ring-condensed polycyclic compound, a heteromonocyclic compound and a hetero ring-condensed heteropolycyclic compound is represented by any one of following Formulae (W-1) to (W-15):

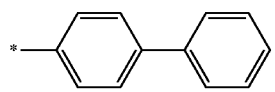
(W-1)

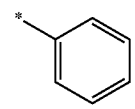
(W-2)

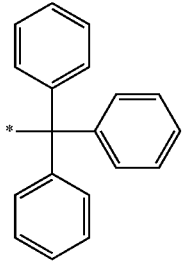
(W-3)

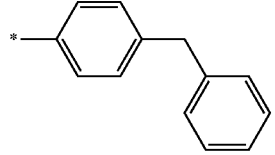
(W-4)

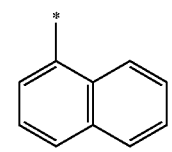
(W-5)

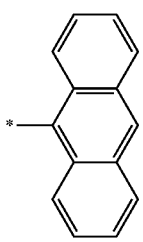
(W-6)

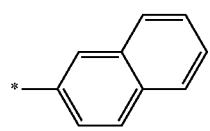
(W-7)

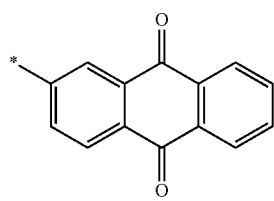
(W-8)

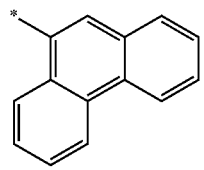
(W-9)

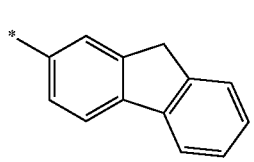
(W-10)

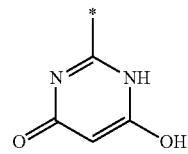
(W-11)

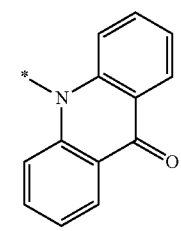
(W-12)

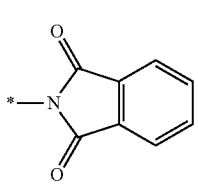
(W-13)

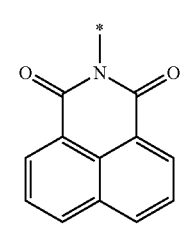
(W-14)

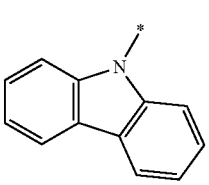
(W-15)

wherein, in Formulae (W-1) to (W-15), * represents a binding position.

7. The active energy ray-curable ink composition according to claim 1, wherein the colorant is a pigment.

8. The active energy ray-curable ink composition according to claim 1, wherein the polymerizable compound is selected from the group consisting of acrylamide, methacrylamide, acrylates and methacrylates.

9. An inkjet recording method comprising:
ejecting the active energy ray-curable ink composition according to claim 1 onto a recording medium using an inkjet recording apparatus; and
irradiating the ejected ink composition with an active energy ray to cure the ink composition.

10. An inkjet printed article obtained by recording by the inkjet recording method according to claim 9.

11. The active energy ray-curable ink composition according to claim 1, wherein a content of water is from 1 to 70% by mass with respect to the total amount of the ink composition.

12. The active energy ray-curable ink composition according to claim 1, wherein the active energy ray-curable ink composition comprises, as the polymerizable compound, at least one water-soluble compound including an ethylenic unsaturated bond.

13. The active energy ray-curable ink composition according to claim 1, wherein a content of the dispersant is from 1 to 150% by mass with respect to a content of the colorant, and a content of the polymerizable compound is from 3 to 35% by mass with respect to the total amount of the ink composition.

14. The active energy ray-curable ink composition according to claim 1, wherein a content of the dispersant is from 5 to 100% by mass with respect to a content of the colorant, and a content of the polymerizable compound is from 5 to 30% by mass with respect to the total amount of the ink composition.

15. The active energy ray-curable ink composition according to claim 1, further comprising a polymerization initiator.

16. The active energy ray-curable ink composition according to claim 7, wherein a content of water is from 1 to 70% by mass with respect to the total amount of the ink composition.

17. The active energy ray-curable ink composition according to claim 7, wherein the active energy ray-curable ink composition comprises, as the polymerizable compound, at least one water-soluble compound including an ethylenic unsaturated bond.

18. The active energy ray-curable ink composition according to claim 7, wherein the active energy ray-curable ink composition comprises the pigment in an amount of from 0.1 to 20% by mass with respect to the total solid mass of the ink composition, a content of the dispersant is from 1 to 150% by mass with respect to the content of the pigment, and a content of the polymerizable compound is from 3 to 35% by mass with respect to the total amount of the ink composition.

19. The active energy ray-curable ink composition according to claim 7, wherein the active energy ray-curable ink composition comprises the pigment in an amount of from 0.1 to 20% by mass with respect to the total solid mass of the ink composition, a content of the dispersant is from 5 to 100% by mass with respect to the content of the pigment, and a content of the polymerizable compound is from 5 to 30% by mass with respect to the total amount of the ink composition.

20. The active energy ray-curable ink composition according to claim 7, further comprising a polymerization initiator.

* * * * *